United States Patent [19]
Notredame et al.

[11] Patent Number: 6,049,390
[45] Date of Patent: Apr. 11, 2000

[54] COMPRESSED MERGING OF RASTER IMAGES FOR HIGH SPEED DIGITAL PRINTING

[75] Inventors: Paul H. Notredame, Wondelgem; Eddy H. Debaere, Deinze; Lieven W. Depuydt; Jan J. Vlietinck, both of Ghent, all of Belgium

[73] Assignee: Barco Graphics NV, Ghent, Belgium

[21] Appl. No.: 08/964,651

[22] Filed: Nov. 5, 1997

[51] Int. Cl.[7] .................................................. G06F 3/12
[52] U.S. Cl. ..................... 358/1.15; 707/530; 707/101
[58] Field of Search .......................... 358/1.15; 707/101, 707/530

[56] References Cited

U.S. PATENT DOCUMENTS

| | | | |
|---|---|---|---|
| 4,300,206 | 11/1981 | Belleson et al. | 358/1.18 |
| 4,493,049 | 1/1985 | Donohue et al. | 364/900 |
| 5,239,625 | 8/1993 | Bogart et al. | 395/128 |
| 5,257,113 | 10/1993 | Chen et al. | 358/426 |
| 5,329,616 | 7/1994 | Silverbrook | 395/164 |
| 5,634,089 | 5/1997 | Kulbida et al. | 395/115 |
| 5,758,042 | 5/1998 | Deschuytere | 395/114 |
| 5,801,716 | 9/1998 | Silverbrook | 345/506 |
| 5,828,814 | 10/1998 | Cyman et al. | 358/1.2 |
| 5,850,504 | 12/1998 | Cooper et al. | 395/117 |
| 5,884,014 | 3/1999 | Huttenlocher et al. | 358/1.15 |
| 5,949,438 | 9/1999 | Cyman et al. | 345/502 |
| 5,953,007 | 9/1999 | Center et al. | 345/339 |

FOREIGN PATENT DOCUMENTS

| | | | |
|---|---|---|---|
| 0 691 784 A2 | 1/1995 | European Pat. Off. | H04N 1/41 |
| 0 703 524 A1 | 3/1996 | European Pat. Off. | G06F 3/00 |
| 0837401 | 4/1998 | European Pat. Off. | G06F 17/24 |

OTHER PUBLICATIONS

Chang, S.–F. and Messerschmitt, D.G. "Manipulation and Compositing of MC–DCT compressed Video," *IEEE Journal on Selected Areas in Communications*, vol. 13, No. 1, Jan. 1995, pp. 1–11.

*Primary Examiner*—Wayne Amsbury
*Attorney, Agent, or Firm*—Dov Rosenfeld; Inventek

[57] ABSTRACT

This invention relates to high speed digital printing of pages each obtained by merging one or more page elements. A method is disclosed for merging page elements which are stored in a compressed format, the merging substantially in compressed domain to enable the an implementation of the method to perform the merge rapidly, keeping up with a fast printing device. The merging occurs according to a page layout script which specifies the positions and printing order of selected page elements on each page. An apparatus for merging also is disclosed.

45 Claims, 8 Drawing Sheets

0 = TRANSPARENT CT
1 = MASKING CT

0 = LW
1 = CT

COMPRESSED MERGING OF RASTER IMAGES FOR HIGH SPEED DIGITAL PRINTING

BACKGROUND OF THE INVENTION

1. Field of the Invention

This invention relates to digital printing of pages containing variable information, with unrestricted variability from page to page. More particularly this invention relates to a method and an apparatus for merging a plurality of compressed data, the merging being carried out without decompressing the data.

2. Description of the Problem

Recent digital printing devices have made it possible to print page sequences where each printed page is completely different from the previous one. This is of particular importance in the production of personalized printed matter, e.g., for direct mailing purposes. Such a system for printing personalized multi-page documents should have the following features:

- the possibility to store parts of those documents for reuse in other documents as page elements;
- an as good as unlimited number of pages in those documents (up to several hundreds of pages);
- no inherent restrictions to the amount of personalized data per page; and
- a high degree of freedom in the design of the personalization (a large number of regions, overlapping regions, etc.)

Such a printing system can be conceptually described as a page element based printing system: a document is created from pages, and each page is created from a number of elements stored in the system in a compressed raster form. In a typical workflow in which the present invention may be used, a prepress system produces the overall description of pages and of the graphical data elements which are the page elements.

A page is typically described using a page description language ("PDL") such as the PostScript® PDL and "PDF®" by Adobe Systems, Inc., Mountain View, Calif., HP PCL by Hewlett-Packard, Inc., Palo Alto, Calif., or by a format such as GRO™ ("GRaphics Objects"), the native internal format used by Barco Graphics NV, Gent, Belgium, the assignee of the present invention. A PostScript file for instance contains a sequential list of commands, which, when interpreted, generate graphical objects such as line work (including text), CT images, paths (a set of vector or spline segments that describe a shape or set of line segments), bounding boxes ("invisible" rectangles that define the boundaries of an object), etc. Paths may have attributes such as stroke and fill, and may define, among other things, bounds of objects, objects themselves, and clipping masks which, when associated with an object, define which part of the object is visible. Such concepts would be well known to those of ordinary skill in the art. PostScript interpreting typically generates a display list of objects, and these objects normally are rasterized prior to printing or display. In the same way a display list of objects can be generated by interpreting page description files in other page description languages. The combined interpreting of the PDL and rasterizing is referred to as raster image processing ("RIPing") and the software and/or hardware system for carrying this out is called a raster image processor ("RIP").

The system driving the print engine must generate a data stream at the speed of the print engine. This means that the data rate of the system is very high, and fully dictated by the imaging speed and the resolution of the printing devices. The Xeikon DCP 32D (Xeikon NV, Mortsel, Belgium), for instance, prints full duplex cyan, magenta, yellow and black ("CMYK") sheets of A4 size at 600 dots per inch and with 4 bits per spot per separation, at a speed of 35 duplex (i.e., double sided) sheets per minute. The output bandwidth necessary to drive this device is over 80 Mbytes per second. If we assume a 50% overlap of the variable objects with the background master object, the raster image bandwidth must be at least 120 Mbytes per second. The I/O bus bandwidth needed is the sum of the input and output bandwidth, plus the bandwidth needed by the merge process and other processes. So the I/O bus bandwidth of the computer system must be more than 200 Mbytes per second, which is well beyond the reach of the standard computer systems that are available today. In the near future even faster printing devices will become available. In the last few years, the increase in data rates of printing devices has outpaced the increase in available affordable computing power.

Description of prior art

The Barco Graphics PrintStreamer I

The Barco Graphics PrintStreamer I (Barco Graphics NV, Gent, Belgium, the assignee of the present invention) is a dedicated hardware system containing one computer board per printing device print head, where each board is connected to its own redundant array of independent disks ("RAID") unit. The post RIPed rasterized and screened pages are stored on those disks in a run length encoded ("RLE") compressed form. At print time one "master" background element can be combined with one "variable" foreground element with exactly the same bitmap size. Both elements are fully decompressed before merging.

The disadvantage of such a system is limited flexibility in the design of the personalized data: there cannot be multiple "variable" elements, covering different parts of multiple "master" elements on one page. This existing system also is not very scaleable, and it is not clear how well it could be adapted to drive faster print engines.

The Barco Graphics PrintStreamer I is an example of a restricted type of variable data system that has the concept of a master page design and variable data, and this is illustrated in FIG. 2(a) which is labeled prior art. Master page 211 is designed, and variable components are merged over master 211. Two instances of variable data V1 and V2 denoted 213 and 219, respectively, are shown. The merged result 215 is shown for the case of merging 213 (V1) with master 211 and the merged result 217 also is shown, this the case of merging 219 (V2) with master 211 A desirable more flexible arrangement is shown in FIG. 2(b), which is not prior art. In this second arrangement, the concept of "fixed" and "variable" no longer exists, although it certainly can be accommodated. Any element can be printed as a page (or subpage), or any element can be merged with other elements to create a new page. The order of merging and the mode of merging (overprint, knockout, etc.) determines what the final page looks like. In the simple example of FIG. 2(b), elements 201, 203, and 207 are to be combined, 201 first, then 203 and then 207. In such a case, the final merged image is the image denoted 205.

Compression of RIPed Data

One way to overcome the bandwidth problem is to compress the RIPed data before storing and transmitting the data to the printing device. With a compression factor of 10 or higher, the bandwidth becomes manageable with software running on a typical computer system. The problem with raster images is that they contain two kinds of objects with totally different characteristics: 1) line work data ("LW") for text, logos, graphs, block diagrams, etc., and 2) continuous tone ("contone," "CT") data for pictures, blends, etc. Because the characteristics of these two types of data are totally different, the typical compression scheme used for these kinds of data is different too. The following table summarizes the characteristics and the compression schemes typically used today:

|  | CT | LW |
| --- | --- | --- |
| Resolution | 300 dpi typical | Output device resolution (600 dpi or higher) |
| Characteristics | Low spatial frequency | High spatial frequency (step discontinuities), but with reasonably long run lengths |
| Preferred Compression Method | Lossy compression, e.g., JPEG, etc. | Lossless compression, e.g., RLE, CCITT G3 or G4, etc. |

European Patent Application EP-0 691 784, entitled LOSSY AND LOSSLESS COMPRESSION IN RASTER IMAGE PROCESSOR, Deschuytere, inventor, and U.S. Pat. No. 5,239,625 (Aug. 24, 1993), entitled APPARATUS AND METHOD TO MERGE IMAGES RASTERIZED AT DIFFERENT RESOLUTIONS, Bogart et al., inventors, describe separating LW data from CT data in the RIP, and handling both data streams separately. The problem with the Deschuytere patent is that halftone line work is handled as CT data. The quality loss in the halftone LW data due to the Joint Photographic Expert Group ("JPEG") compression used for CT is unacceptable in most high end applications. In the Bogart et al. Patent, each job has to be RIPed twice, once to generate the line work bitmap and once to generate the contone bitmap. In most work flows, RIPing already is a bottleneck, so RIPing twice is unacceptable.

Merging of Variable Data at Print Time

The number of vendors that sell printing systems that actually handle variable data after RIPing presently (1997) is limited, with the Barco Graphics PrintStreamer I as one example (see above). European Patent Application EP-A-0 703 524, VARIABLE DATA FIELDS INA PAGE DESCRIPTION LANGUAGE, Herregods et al, inventors, describes another one. The system described by Herregods et al. merges variable data using bitmap operations as follows:

a single master is RIPed and stored as an uncompressed bitmap in memory;

with special postscript instructions, parts of that bitmap are copied to a cache;

the postscript code for the variable data is RIPed and parts of the cached master bitmap are overwritten; and after printing the parts of the master bitmap that were changed are restored.

The last two steps are repeated for all the instances of the variable data.

The flexibility of the Herregods et al. system is limited: the system cannot print personalized documents in collated order, as the system cannot deliver the bandwidth required to refresh the master bitmap at the speed of the printing device. Also, master and variable data are combined with special operators in the PostScript file, so object reuse in different jobs is as good as impossible. It would be advantageous to have a method where there is not necessarily a link between the different page elements that make up a final page until actual merging, so different elements can come from different page description files, may be generated using different prepress packages, etc.

Merging of Compressed Data

The combination of different page elements into a single page is typically performed by first decompressing the different page elements, combining them and then possibly compressing the complete page again. Since decompression is compute-intensive, this often precludes a pure software solution for the combination performed to send it in real-time to a high speed digital printer. An additional problem with decompressing prior to merging is that the amount of data to be combined increases significantly, placing strain on memory bandwidth which again may preclude a pure software solution. That is, the decompression before combination of the different page elements has the disadvantage that it requires a lot of storage space and a high bandwidth for data transmission.

It would therefore be advantageous to have a method and apparatus for merging different page elements, the page elements being compressed, the merging being carried out substantially without decompressing the data, thus saving computing time as well as storage space. Such an approach is not known in the area of printing. It is known however in another field: motion video, where there is a need to simultaneously receive multiple motion videos from different sources and display them on a single screen via a set of overlaid video windows. U.S. Pat. No. 5,257,113, (Oct. 26, 1993), entitled VIDEO MIXING TECHNIQUE USING JPEG COMPRESSED DATA, Chen et al., inventors, describes a method and apparatus for displaying a plurality of video windows (e.g., 30 frames/sec NTSC or 25 frames per second PAL) on a display screen, wherein the data for the windows are mixed in the compressed data domain. All the operations are performed on 8×8 DCT blocks. Chang and Messerschmitt also target broadcasting and video conferencing in their publications on the manipulation of JPEG and MPEG compressed images in the DCT domain (see "Manipulation and compositing of MC-DCT compressed video," IEEE Journal on Selected Areas in Communications, vol. 13, no. 1, January 1995). In the Chang and Messerschmitt publication, formulas are presented for opaque (i.e., knockout) and semi-transparent (i.e., with an alpha channel) combining of compressed images on a block-by-block basis, and on a pixel-by-pixel basis, all in the DCT domain. They also describe how one can shift a DCT compressed image over a number of pixels, if the additional degradation is acceptable in the output stage. The Chen et al. patent and the Chang and Messerschmitt publication are directed towards motion video, so do not describe the steps and/or apparatus that are needed to effectively use these ideas for real time printing. Such additional steps and apparatus would not be clear to one in the art. The computational complexity of the Chang and Messerschmitt formulae for pixelwise merging is too high for the printing application, so there also remains a need for a different technique for pixel wise knockout overlap. In addition, for the printing application, it is advantageous to be able to rapidly merge objects of any arbitrary shape, as described, for example, by a graphic arts clipping mask, a requirement the prior art does not really address. The prior art also does not describe how one would speed up merging of DCT encoded data by means that enable one to quickly locate DCT blocks at any position. There also remains a need in the art for mechanisms to enable one to maintain optimal image quality, to keep up with the press, and to batch merge some parts of a page in advance if a page is too complex.

Thus these prior art techniques are not usable for the present printing application, and there is no suggestion in the prior art as to how to adapt these prior art techniques for the printing application.

Thus, in combining page elements for rapid printing, there is a need for a method and apparatus that performs the combining substantially in the compressed domain, while being able to accurately geometrically align the elements. There also is a need to be able to merge variable elements of arbitrary shape.

SUMMARY OF THE INVENTION

One aspect of the invention is a computer implemented method for merging page elements into pages, the method capable of operating at the speed of the current and upcoming fast digital color printing systems. The method is flexible in that, while it may be implemented as hardware, in a described preferred embodiment it is implemented on a standard computer system, and may so be implemented on a range of computer systems. The ability of the method to keep up with fast digital color printing systems is a result of the data remaining essentially compressed in all the stages of the merge method until final decompression of merged pages for printing.

Another aspect of the invention is a method and system that can fetch page element data for merging from page element storage at the speed of the output device, this as a result of the data remaining essentially compressed during merging and as a result of including a caching step in the method (and a memory configured as a page element cache in the apparatus), the cache ensuring that page data is available from memory for the merging step.

One embodiment disclosed is a method of generating one or more pages for a digital printing press, the method including the steps of preparing a plurality of page elements, each preferably defined as page description language files. Multipage page description files may optionally be used to generate a series of page elements. Ink properties (knockout, overprint, etc.) are included to enable the overlap of different page elements. A technique for defining non-rectangular page elements includes using a transparent white background. Another step is rasterizing (RIPing) and compressing the page elements at the resolution of the output device to form compressed page elements. The compressed page elements are stored in a page element store, which may be implemented in one (or more) of many ways, including as a disk store, a random array of independent disks (RAID) system, a fast optical store, etc.

In the method, a merge script (page layout script) is created describing one or more pages by specifying the page elements, and their attributes, including position, margins, overprint order and merge mode (overprint, knockout, overprint based on ink properties, transparency, etc.). Theoretically there is no limit on the number or size of elements included on any page.

For each page, the page elements that are included in the page are merged according to the page layout script, the merging generating compressed image data that represents the page, the merging step essentially occurring in the compressed domain. That is, during the merge process, the page elements remain compressed, except that occasionally some boundary pixels may need to be decompressed, when very accurate positioning and arbitrary shaped object masks are included. The compressed image data generated by merging is decompressed into raster image data, and the raster image data printed on the output device (the digital printing press). The steps merging, decompressing and printing are repeated for each page that has to be printed An aspect of the method is that there is not necessarily a link between the different page elements until the moment that they are brought together according to the merge script, so different elements can come from different page description files, may be generated using different prepress packages, etc.

In another aspect, the page elements in the above method include line work data. In yet another aspect, the page elements include CT data. In another aspect, the CT data has associated with it mask data to define a mask around the CT data. In yet another aspect, the page element includes LW data, CT data and mask data. For the latter situation, an embodiment of the method for generating one or more pages for a digital printing press is disclosed which includes in the RIPing step separating the line work data and the CT data, compressing the rasterized line work data using a line work compression method to form compressed line work page element data, and compressing the rasterized CT data using a CT compression method to form compressed CT page element data, the compressed page element thus including the compressed line work page element data, the compressed CT page element data and the mask data. In one implementation, a CT selection mask is generated, compressed and included in the compressed page element, the CT selection mask referring to the pixels in the page element so that each pixel in the page element can be identified as a LW or CT pixel.

In the disclosed implementation, the merging of compressed page elements includes merging the mask data, merging the compressed line work page element data of all the page elements to form compressed merged line work data, and merging the compressed CT page element data of all the page elements to form compressed merged CT data. The merged mask data, compressed merged line work data and compressed merged CT data are in the compressed image data. The compressed merged line work data and the compressed merged CT data are decompressed and combined into the raster image data.

In one embodiment, the merged mask data is a merged CT selection mask and the combining is selecting pixels for printing from the decompressed linework or decompressed CT data according to the value of the merged CT selection mask for the pixels.

In one embodiment disclosed, the line work compression method is a run length encoding method (RLE) and the CT compression method is a block based method. One such block based method is JPEG which works on 8*8 blocks.

As a refinement, in another aspect disclosed, additional data is added to the compressed page elements, the additional data enabling quickly locating a desired location. For the case of compressed line work page element data compressed using RLE, the additional data includes a lookup table containing an offset to the beginning of each row. For the case of compressed line work page element data compressed using the JPEG method, the additional data includes restart markers in the JPEG data.

One aspect of the invention enables rapid merging by ensuring that the relative positioning of CT data is on the boundaries of the blocks defined by the CT compression method (the CT blocks). An embodiment of the method is disclosed which includes repositioning the CT page element so that merging occurs on CT block boundaries.

In another aspect of the method, the line work data in the page elements is at a line work resolution, and the CT data in the page elements is at a CT resolution, the line work resolution being the same as the CT resolution. In yet another aspect, the line work resolution differs from the CT resolution and is at the resolution of the digital printing press.

In another aspect of the invention, the CT compression method is JPEG and uses a set of one or more quantization tables each table corresponding to a compression quality. In a particular embodiment, the tables in the set of quantization tables are related to each other by a set of relationships so that any re-quantization is computationally efficient using one of the relationships.

One aspect of the method of the invention is the ability of merge elements that are defined by arbitrary shapes. In one embodiment, for CT data of a page element, the arbitrary shape is defined by a mask, which may be implemented many ways, including as a bit map and as a clipping path. In one embodiment disclosed, the mask is implemented as a CT validity mask which defines which CT pixels in the CT data of a page element are valid. The CT validity mask is part of the page element. In an embodiment disclosed with a block-based CT compression method, as part of the merge operation, the CT validity mask is used to define boundary blocks and interior blocks of compressed CT page element data. The boundary blocks are merged differently from the interior blocks, and in one specific embodiment, the boundary blocks are merged by first decompressing these to-be-merged boundary blocks.

Another aspect of the invention is an apparatus for merging page elements into compressed merged data is described. An embodiment of an apparatus is disclosed which comprises a first storage device where page elements are stored in a compressed format. A second storage device is included a page composition script is stored in it. This page composition script specifies the identifiers, positions and printing order of selected page elements which are to be included in the compressed merged data to be formed. On the basis of what is specified by the page composition script, a merge system retrieves compressed data of the individual page elements stored in the first storage device, and merges them according to the page composition script into compressed merged data, the merging substantially in the compressed domain so that substantially no decompression takes place.

In one preferred embodiment, the first storage device is a RAID system, and the second storage device is a disk drive. In another preferred embodiment, at least one of the storage devices is a memory. The merge system may be implemented as software running on a processor, or a piece of hardware circuitry, which may include a separate processor, for carrying out the function. If the merging means include a processor and a memory, said memory includes a set of computer instructions running on said processor. This set of computer instructions causes the processor to read the page composition script and to retrieve the page elements as specified in the page composition script. Decompressing means also may be added, and implemented as software running on a processor, or as a piece of hardware circuitry, which may include a separate processor, for decompressing the compressed merged data in order to have it printed. If the decompressing means include a processor and a memory, the memory includes a set of computer instructions running on the processor. This set of computer instructions causes the processor to decompress the compressed merged data. In cases when different compression methods are used for line work data and CT data which is included in one or more of the page elements, in one embodiment, the merging means is duplicated, and in another the merging means has two operating modes, depending on the encountered format.

Another aspect of the invention is a complete system for merging and printing data on a printing apparatus, the merging substantially in the compressed domain. One preferred embodiment disclosed for the complete system includes a RIP (and compressor) used to form compressed CT and compressed line work data from page element files to generate compressed page elements which include the compressed CT and compressed line work data. The RIP preferably but not necessarily produces pixel data which is unscreened, and separated into the printing colors, for example CMYK. The system disclosed also includes a page element store in which these compressed page elements are stored, and in one embodiment, the element store is a RAID subsystem Which page elements are merged into which page elements and the location of each element on the page is determined by a page layout script which is stored and interpreted by a merge system. The disclosed merge system embodiment includes a read subsystem for retrieving the required page elements from the page element store into a page element cache, and a merger for merging line work compressed data and CT compressed data, the merger obtaining the line work compressed data and CT compressed data from the page element cache. The cache preferably is a memory. The merger merges selected page elements according to the page layout script, the merging substantially in the compressed domain, to generate compressed page data which includes final line work compressed page data and final CT compressed page data. The disclosed merge system embodiment includes a decompressor which decompresses the final line work and CT compressed page data to generate complete decompressed LW page data and complete decompressed CT page data, respectively. These decompressed complete pages are combined into a single final page in a combiner/screener, which also screens the page data. The screened page data is fed to the print heads of the printing apparatus at the rate required by the print heads of the printing apparatus.

The preferred embodiments of the method and apparatus of the present invention have been described assuming, as an example, JPEG compression for CT data and RLE for line work. The method and apparatus disclosed are not restricted to these particular compression formats. They can be used with any compression format as long as the format allows insertion of bitstreams representing compressed image representations into a similarly formatted bitstream. Where these bitstreams should be inserted can then be specified by a marker (when the compression format allows) or a pointer (kept separate from the format).

BRIEF DESCRIPTION OF THE DRAWINGS

FIG. 3 illustrates a simplified example of two CT page elements to be merged;

FIG. 4 illustrates a data stream consisting of compressed block representations each preceded by a restart marker ("RST");

FIG. 9(a) shows the example of a page element, FIG. 9(b) shows the CT data of the element of FIG. 9(a), FIG. 9(c) shows the CT validity mask for the CT data in the element of FIG. 9(a), FIG. 9(d) shows the LW data of the element of FIG. 9(a), and FIG. 9(e) shows the CT selection mask which is included in the LW data of the element of FIG. 9(a);

DESCRIPTION OF THE PREFERRED EMBODIMENT

Description of the Complete System

The described invention can be used as part of a complete system for a printing factory based on a digital printing press. An example of such a system is illustrated as 1001 in FIG. 10. Following is a general description of the components of such a system and of the interactions between those components. Following the general description, the main components of one embodiment of our invention, shown as rapid merge system 1003 inside the dashed box, are described in full detail.

Figure 10:
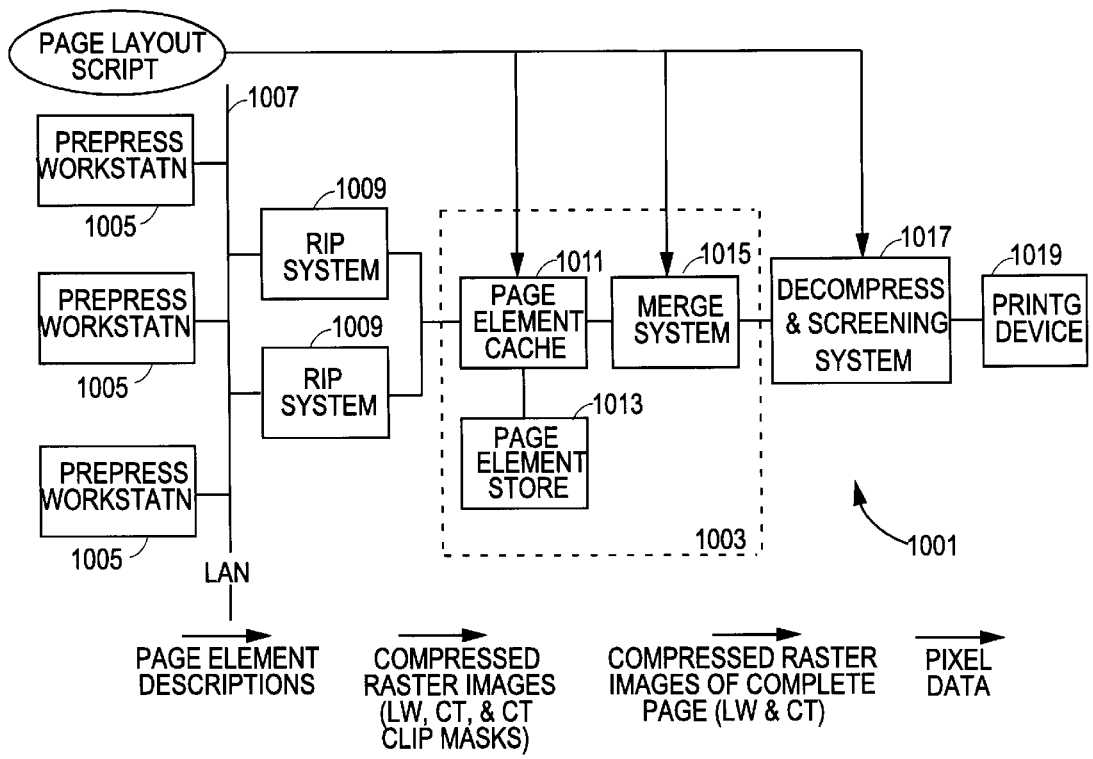
FIG. 10 shows a typical system for document production which includes an embodiment of the present invention.

FIG. 10 is the starting point of the description of our preferred embodiment, and is by no means the only possible configuration, or the only way element 1003 may be used in a complete system.

The Prepress Workstation 1005

Three workstations denoted as 1005 are shown in FIG. 10, all connected to a local area network ("LAN") 1007. More or fewer workstations may be part of the system. Workstation 1005 may be standard computers, and may contain several software modules, including standard prepress software such as Adobe Photoshop and/or Adobe Pagemaker, by Adobe, Inc. of Mountain View, Calif., and/or QuarkXpress, by Quark, Inc., of Denver, Colo. After an overall document, called a book, is designed, such standard prepress software is used by a designer to create the different individual page elements of the pages of the book, each individual element designed as if it was an individual page. The page element data are then sent to a RIP system as if the designer were using a standard printer. Thus some of these page element pages might be very small—the dimensions of the particular page element.

The overall design of a book is specified by the designer in a page layout script. The structure of the page layout script will be described in more detail later in this description. For database printing where many different instances of some elements act as variable elements, a user designs templates for the layout of the document, and special software is used to generate instances of the actual pages as page elements. This software generates, for the case of "variable" data, a set of pages, each individual page being a particular instance of the page element which takes on the variable data. Note that to the system, there is no notion of "variable data" or a "master" as in prior art systems such as the Barco Graphics PrintStreamer I. In our new system which embodies some aspects of the present invention, all page elements are "equivalent" in the way they are processed. The ordering and merge mode of such elements define how the final page looks.

Note that two RIP systems 1009 are shown connected to LAN 1007 in the system of FIG. 10, and more or fewer RIP systems can be used, or the RIP system may be part of workstation 1005, or part of the computer system used to embody the rapid merge system 1003. Each printer driver in the workstation software modules used for design generates an object description in a standard PDL such as Adobe PostScript or Adobe PDF, or the printer driver can output to a proprietary PDL such as HP PCL or GRO. The only requirement in our preferred embodiment is that the PDL enables the RIP (1009) used for RIPing such a PDL to distinguish LW data from CT data. However there is a lot more flexibility in the page design if the PDL also enables the RIP 1009 to distinguish overprinting colors from masking colors, and a masking white color from an empty background, so that the RIP 1009 can encode overprint information in the page elements. Such is the case in the preferred embodiment.

Thus, the designer designs individual page elements as PDL files. In general, these may be single page or multipage PDL files. For example, multipage PDL files preferably are used for "variable" data elements, "variable" in the sense that there is a common design thread that may take on different values in different instances. In such a case, each page may be a different instance. Multipage PDL files are treated as an array of elements, where each element (page) can be accessed individually. Consider, for example, a personalized form letter to be used in a sales promotion. One of the elements of such a design might be the signature of the author of such a letter, and the letter may be used (signed) by one of several salespeople. The signature element might for this example be designed as a multipage PDL file, each page being the size of the largest possible signature to be printed, each page containing the signature of a particular salesperson. If this file is called Salesman_signature, then one such signature, say the 25h, would be referred to as Salesman_signature [25] . Recall that in the preferred embodiment, there is really no concept of a master page and variable elements; all page elements are equivalent, and the order of type of merging defines the final appearance. Multipage PDL files are simply a convenient way of dealing with a set of elements.

The RIP System 1009

The page element descriptions (in the form of single or multi-page PDL files) are sent to one or more Raster Image Processing ("RIP") systems 1009. FIG. 10 shows this sending being via LAN 1007, and clearly this is not the only configuration possible. Once the data is received, in our preferred embodiment RIP 1009 separates LW data from CT data using the internal display list of the RIP 1009, and generates three separate raster images for each color separation. The RIP produces pixel data which is unscreened;

screening is carried out after merging and prior to printing. The number of separations depends on the particular target printing device, and might be four (e.g., CMYK), six (e.g., CMYK plus two PANTONE inks), seven (e.g., CMYK plus RGB, as in what is called "hifi" color), etc. The output raster images are compressed depending on the type of data In the particular embodiment aimed at four color duplex printing, the three types of outputs for each separation generated by RIP system 1009 are:

CT data. CT data is compressed with the JPEG algorithm. The JPEG format allows any encoded block to be preceded by a special 16-bit aligning marker (also called restart marker) denoted RST. This 16-bit aligning marker eases the searching across a JPEG bitstream; one searches for the special 16-bit RST value, comparing each 16-bit word of the bitstream. In our preferred embodiment, the JPEG data is enriched with restart markers so that the merge system can quickly locate any (x,y) position in the compressed raster image. To put a RST marker before every block would deteriorate our compression ratio considerably. So, in the preferred embodiment, at RIP time, RST markers are added every number, say n, of blocks, and at merge time RST markers are added at the boundaries of objects if necessary. This is described in more detail further on. The CT resolution may be the same or lower than the device resolution. For our implementation for the above mentioned Xeikon printing device which prints at 600 dots per inch (dpi), CT data has a resolution of 300 dpi.

CT validity mask: The CT validity mask is a binary mask at CT resolution that flags which CT pixels contain valid data. This enables our merge system to more quickly merge CT data of overlapping elements, if the 8*8 pixel blocks with valid CT data don't overlap. The CT validity mask can help reduce artifacts of the lossy compression and speed up CT merging by validating certain CT covered by LW. (e.g., CT covered by text is validated; see FIG. 9). The CT validity mask can have an arbitrary boundary, it can be made up by disjoint domains that can have any shape. Validating CT under certain LW reduces the validity mask boundary and hence reduces CT merging complexity. Compression artifacts are also reduced because of the fewer boundaries between distinct CT, after CT merging. These otherwise could introduce ringing artifacts due to lossy compression. One simply uses the CT validity mask to indicate which existing CT pixels are not valid. Thus, the CT validity mask is stored as 8*8 blocks of pixels, a special code is used for a block in which all 64 pixels are valid and another code for the case of all 64 blocks invalid. Successive rows of valid or invalid blocks are compressed with run length encoding (RLE). Other blocks are stored as a 8x8 bitmaps. Also, preferably, the CT validity mask is extended beyond the CT selection mask so that it follows the 8*8 JPEG block boundaries of the CT data.

LW data: LW data is compressed with an RLE algorithm, the data header containing a table with the offset to the start of each line in the stream so that, again, the merge system can locate any pixel quickly. The LW resolution preferably but not necessarily is equal to the output printing device resolution, which for the Xeikon is 600 dpi. A CT selection mask is a binary mask that enables the decompression system to decide whether an output pixel has to come from the LW data or CT data. The CT selection mask resolution in our system is of the same resolution as the LW data, and is encoded as part of the LW RLE data. Each LW data run thus includes a flag to indicate whether the run is CT or LW (this is the CT selection mask part of the LW data). If LW, the run also includes the color value, and whether the LW data is masking, overprinting, etc.

A page element normally would contain both LW and CT data, and in such a case, all three data types (CT data, CT validity mask and LW data, which might include an embedded CT selection mask) are stored together as one file. The system designer would design the file structure to enable efficient printing with the particular printing devices to be connected to the system. A design decision made was to split page elements into horizontal strips, each strip having a height of one CT block, i.e., 8 CT pixels. In the Xeikon, since LW is printed at twice the resolution of CT, a strip of LW data thus is 16 pixels high. A subpage in our system consists of a number of consecutive strips, thus at full page width, and with a length chosen so that the amount of memory taken by the subpage can easily be handled by the different buffers in our preferred embodiment. Thus, when a complete page cannot be handled, a subpage is merged at a time. This may happen with such printing devices as the Xeikon, which can print "pages" of several meters in height. Since there is no difference conceptually between a page and a subpage, the term "page" is used herein to include a subpage for the case that subpages only are merged. Another design decision is how to store the separations. In order to allow parallel processing of each of the separations, data is stored separation by separation, and each separation has its own CT validity mask and CT selection mask. This allows not only for parallel processing of each separation separately, but also for having different CT clip and selection masks in each separation. Thus, in our system, a page element is written into one file with the three kinds of data (CT, CT validity mask, and LW) strip and separation interleaved. For example, for a single sided page element of CMYK data, the order the data is written is in the order of printing (the Xeikon print in order Y C M and K):

| | |
|---|---|
| CT | strip 1 of Y (1 block high) |
| CT | validity mask strip 1 of Y (1 block high) |
| LW | strip 1 of Y (16 lines high) |
| CT | strip 1 of C (1 block high) |
| CT | validity mask strip 1 of C (1 block high) |
| LW | strip 1 of C (16 lines high) |
| CT | strip 1 of M (1 block high) |
| CT | validity mask strip 1 of M (1 block high) |
| LW | strip 1 of M (16 lines high) |
| CT | strip 1 of K (1 block high) |
| CT | validity mask strip 1 of K (1 block high) |
| LW | strip 1 of K (16 lines high) |
| CT | strip 2 of Y (1 block high) |
| CT | validity mask strip 2 of Y (1 block high) |
| LW | strip 2 of Y (16 lines high) |
| CT | strip 2 of C (1 block high) |
| CT | validity mask strip 2 of C (1 block high) |
| LW | strip 2 of C (16 lines high) |
| . . . etc. | |

FIG. 9 is an example of one separation of a page element file. The page element 903 as printed is shown in FIG. 9(*a*) and has in it a continuous tone circle 909 with a line work letter T 907 in black on top. The background 905 is transparent and used to indicate the positioning of the visible object relative to the overall page element 903. The components of page element 903 are the CT data 913 shown in FIG. 9(*b*), the LW data 923 shown in FIG. 9(*c*), the CT validity mask 933 shown in FIG. 9(*d*), and the CT selection mask 943 shown in FIG. 9(e). CT data 913 includes the CT object designed by the user and the background area 915 in transparent white that the RIP included in the CT data. The boundary of CT area 919 is shown as 911. It should be noted that even though the appearance of the CT object in the page element 903 is circular, the CT object boundary 919 is rectangular. CT validity mask 933 describes what part of the CT data 913 has valid CT information and in general would be smaller than the CT area 919 for the above described reasons. Note that the CT validity mask preferably does not include the area over which the line work "T" occurs in order to reduce the mask's complexity (other implementations certainly may include the T in defining the boundary of the CT). Also note that it is here that the shape of the boundary (circular) is defined. In our implementation, the CT data and CT validity mask are in the CT resolution, 300 dpi, and in FIG. 9(d), white are 935 indicates invalid data (mask value 0) and shaded region 939 indicates valid data (mask value=1). LW data 923 includes the LW object (the "T") designed by the user and the background area 925 in transparent white that the RIP included in the LW data. CT selection mask 943 indicates which pixels are CT data and which are LW data, and is used for final combining of the merged CT data and LW data. White regions 945 and 947 indicate that LW data is to be printed (mask value 0) and shaded region 939 indicates CT data is to be printed (mask value=1). The CT selection mask is part of the LW data, and hence has the same resolution, 600 dpi in the case of printing to the Xeikon printing device.

The design decisions discussed herein are implementation details and are not limitations of the invention. Other design decisions may have been made that lead to, for example, different ways of representing boundaries of page elements, different data structures for a page element, different file structures, different ways of handling merging, for example as two-dimensional areas rather than strips, or as complete pages (subpages), etc. Thus the implementation details are in no way to be taken as limiting the scope of the present invention.

As discussed further on, there may be situations where the CT validity mask may need to be displaced by at most four pixels. To enable this to happen, in one implementation, the RIP ensures that the objects are larger than the CT selection mask by at least four pixels, and when not the case, enlarges the objects to guarantee this border. In another aspect, when the overall workflow is available, object placement is made so that it always falls on CT block boundaries.

The file comprising all the data for any single page element is then sent to the rapid merge system, denoted 1003, for merging with the other page elements as specified in the page layout script. CT data and LW data are separately merged to generate merged CT and merged LW data, which later is decompressed, combined, and screened. Merging preferably and not necessarily is carried out strip by strip, and separation by separation. A page element is identified by a single file name, and that file includes all the data for that page element. As described earlier, multipage elements also may be used, and are suitable, for example, for describing variable data. These multipage elements can be written sequentially into one file, or they can be written each to a separate file using a file name suffix to identify each individual page. The latter mechanism makes page parallel RIPing easier to implement. These are all implementation details, and other ways of implementing may be chosen.

The Rapid Merge System 1003

Rapid merge system 1003 includes the page element cache 1011, page element storage 1013, and the actual merge system 1015. The preferred embodiment of rapid merge system 1003 is implemented on a computer called the assembler computer herein. In particular, the preferred embodiment of the method of the present invention comprises steps performed by the assembler computer executing a software program, and the preferred embodiment of the apparatus of the present invention comprises the assembler computer or components of the assembler computer including memory loaded with software commands causing the assembler computer to operate in a particular way.

Figure 1:
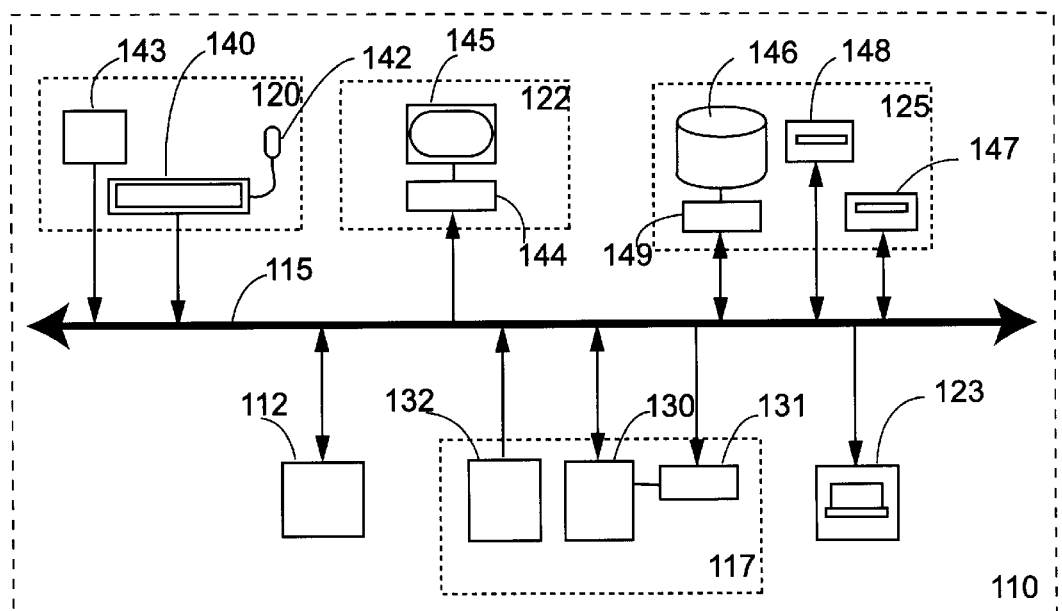
FIG. 1 is a block diagram of a typical computer system in which the present invention may be embodied.

FIG. 1 is a simplified block diagram of a computer system 110 which can be used for the assembler computer in which the present invention may be embodied. The computer system configuration of the assembler computer illustrated at this high level is standard, and as such, FIG. 1 is labeled "Prior Art." A computer system such as system 110, suitably programmed to embody the present invention, however, is not prior art. The specific embodiments of the invention are embodied in a general-purpose computer system such as shown in FIG. 1, and the remaining description will generally assume that environment. However, the invention may be embodied also in dedicated devices such as printer servers, and printer controllers, and these devices may include many of the elements that also are in a general computer system such as computer system 110.

It should be noted that prepress workstation(s) 1005 and RIP system(s) 1009 also typically are general purpose computer systems which in general would have the same architecture as that of FIG. 1. In some implementations, for example low-cost implementations, RIP system 1009 or even prepress workstation 1005 may be implemented on the same assembler computer as rapid merge system 1003.

In accordance with known practice, assembler computer system 110 includes a processor 112 that communicates with a number of peripheral devices via a bus subsystem 115. These peripheral devices typically include a memory subsystem 117, a user input facility 120, a display subsystem 122, output devices such as a printer 123, and a file storage system 125. Not all of these peripheral devices may need to be included for all embodiments of the invention.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers ("PCs") and workstations.

Bus subsystem 115 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system or an embedded controller.

Memory subsystem 117 includes a number of memories including a main random access memory ("RAM") 130 and a read only memory ("ROM") 132 in which fixed instructions are stored. In the case of Macintosh-compatible personal computers this would include portions of the operating system; in the case of IBM-compatible personal computers, this would include the BIOS (basic input/output system). In some embodiments, DMA controller 131 may be included. DMA controller 131 enables transfers from or to memory without going through processor 112.

User input facility 120 typically includes a keyboard 140 and may further include a pointing device 142 and a scanner 143. The pointing device may be an indirect pointing device such as a mouse, trackball, touchpad, or graphics tablet, or a direct pointing device such as a touchscreen incorporated into the display.

Display subsystem 122 typically includes a display controller 144 and a display device 145 coupled to the controller. The display device may be a cathode ray tube ("CRT"), a flat-panel device such as a liquid crystal display ("LCD"), or a projection device. The display controller provides control signals to the display device and normally includes a display memory (not shown in the figure) for storing the pixels that appear on the display device.

The file storage system 125 provides persistent (non-volatile) storage for program and data files, and typically includes at least one hard disk drive 146 and at least one floppy disk drive ("diskette") 147. One or more of the disk drives 146 may be in the form of a random array of independent disks ("RAID") system, while others may be more conventional disk drives. The disk drive 146 may include a cache memory subsystem 149 which includes fast memory to speed up transfers to and from the disk drive. There may also be other devices such as a CD-ROM drive 148 and optical drives. Additionally, the system may include hard drives of the type with removable media cartridges. As noted above, one or more of the drives may be located at a remote location, such as in a server on a local area network or at a site on the Internet's World Wide Web.

The specific assembler computer 110 used in the preferred embodiment is a Digital Equipment Corporation (DEC) Alpha Personal Workstation (Digital Equipment Corporation, Maynard, Mass.) which uses as processor 112 a high speed DEC Alpha processor.

The Page Element Cache 1011 and Page Element Storage 1013

The RIP subsystem 1009 may not be able to keep up with the printing device 1019. Therefore, in many systems, including that of the preferred embodiment, raster images usually are RIPed in advance and stored, for instance as files on a page element storage unit 1013 which in our system is a RAID system (which herein will be given the same reference numeral 146 as any other disk drive in the file storage system which may include many disk drive units). Note that page element store 1013 may alternatively be implemented in one (or more) of many ways, including as a disk store, a RAID system, a fast optical store, etc. Printing starts as soon as all the raster images for a certain job are available. For the system to operate with no additional means, the main requirement for element store 1013 is that it must have enough bandwidth, so that on the average the merge process (merge system 1015) can retrieve the object data at the speed of the press (printing device 1019). Normally this might not be possible without some additional means. In our preferred embodiment, a buffering system is used to alleviate this speed requirement. That is, as shown in FIG. 10, RIPed data is not written directly to element store 1013, but rather to a buffer which is part of a page element cache memory 1011. Page element cache memory 1011 handles all the communication between page element store 1013 and the rest of the system, and includes several structures implemented as part of RAM 130. The buffer between the RIP system(s) 1009 and page element storage 1013 is one such structure. Another part of the cache 1011 deals with removal of page elements from page element store 1013 to the merge subsystem 1015 and will be described more fully later. The buffer in element cache 1011 is for using the bandwidth of element store 1013 in an efficient way. RIPed page elements are buffered in the page element cache 1011, and are only stored in the page element storage 1013 from the buffer in cache 1011 if the merge process in merge system 1015 does not need the bandwidth of the page element storage 1013 as indicated by the actual disk device 146 implementing page element storage 1013 being idle.

In an improved embodiment, the user can indicate that some page elements will be printed only once, so those objects are not written into element storage 1013, but left in the buffer of page element cache 1011, together with some flag or other means of communicating this to the merge system 1015. When the part of the merge system that reads data from storage seeks such a page element, it then does not need to retrieve it from page element store 1013, thus saving two disk accesses.

The other aspects of page element cache 1011 deal with retrieval by the merge system 1015 of page elements from page element store 1013. Such retrieval is made more efficient by the cache 1011 as follows:

The number of disk seeks of page element storage 1013 is minimized because one reads the page elements one by one into the cache memory 1011, and then once available in cache 1011, retrieves page elements rapidly to the merge system 1015 from cache 1011;

Page elements that are used multiple times in a book are kept in the page element cache memory 1011, so that the system need read them only once from the page element storage 1013;

Note that while cache devices are known in the art, page element cache 1011 differs in that it takes advantage of the fact that we know in advance what is needed. A more detailed description of the element cache 1011 and element store 1013 can be found later in this description.

The Page Layout Script

The page layout script typically is generated in workstation 1005. In the preferred embodiment, the page layout script is a text (ASCII) description which is an ordered list of books, each book including an ordered list of pages, each page including an ordered list of page elements, and each page element including an ordered list of properties. The properties of any page element include, in order, the element identifier (a number), the element file name (a file name and, for multipage files, a page number within the file of the page element), the position (a horizontal and a vertical position with respect to the top left hand corner of the page), and the merge mode (knockout, overprint, etc.). Although one may enter such a script manually using a text editor, one also can use an automatic script generator running on workstation 1005 which is tied to a database system for variable printing. Whether written manually or with the aid of a computer based system, the page layout script is stored in disk storage, which may or may not be the same physical unit as page element storage 1013. The script is preferably but not necessarily executed by the same processor 112 as that which executes the programming that implement page element cache 1011 and the merge system 1015. The ordering of the page elements in the ordered list of page elements making up a finished page is important if page elements overlap. In general, a page element is printed on top of all the previous page elements. The following table summarizes the specifications of a page layout script for a simple (one page) personalized letter to customers used herein as an illustrative example:

TABLE 1

Page 1: size 8.5 * 11 inch

| Element id | Element file name | Position (inch) | Merge mode |
|---|---|---|---|
| 1 | Background_image | −0.5, −0.5 | |
| 2 | Customer_address[1] | 5, 1.7 | Knockout |
| 3 | Letter_to_customer | Center, (2) +1.2 | Blackoverprint |
| 4 | Salesman_signature[25] | Left, (3) +1.2 | |

For this example, the page identifier identifies this as the first page (page 1) with size 8.5 by 11 inches. If no size is specified for any page, the page size is taken in our preferred embodiment as the size of the union of all page element in the page, i.e., as the bounding box of all the elements used. In a typical design, this might be (but not necessarily is) the size of the bottom page element. The element identifier is in the form of a number. The element file name is the file name reference. Thus Background_image is the file name of the page element that is, in this example, the background of the page, while Salesman_signature[25] is the fourth page element printed (in order) and refers to the 25th page element in the multipage file Salesman_signature which stores all the different signature images for all the different salespeople. The horizontal and vertical positions for each page element are in relation to the top left hand corner ("origin") of the overall page, page 1, and distances are measured in inches, with positive numbers indicating left to right for the horizontal case, and top to bottom for the vertical. The preferred embodiment script permits three ways of specifying distances. The first is as an absolute distance from the origin. Thus element identifier 2 is positioned 5 inches to the right and 1.7 inches down from the origin. The second way is as an alignment, for example, centered, left aligned, right aligned, etc. The third way is relative to other objects, with the syntax of the reference being in parentheses, and the relative distance preceded with a plus or minus sign to indicate direction. Thus, in this example, element identifier 4 is positioned aligned to the left of the page (indicated by the word "Left" for the horizontal position), and vertically positioned 1.2 inches below element identifier 3 (the file Letter_to_customer). A preamble in the page layout script specifies such details as what units are used for distance measurements. If no units are specified, a default is assumed.

The merge mode indicates how merging will occur. In the preferred implementation, Knockout means the page element knocks out all page elements underneath at that location. All CT page elements presently are merged in Knockout mode, although, as would be clear to those in the art, improved embodiments are possible wherein CT elements may have different levels of transparency, etc. using such well known concepts as an alpha channel. For JPEG data, for example, it is known that the DCT is linear, and this linearity can be used to affect merges with alpha channel data. Overprint mode is used for line work only, and states that separation by separation the intensity of the upper object is used, except if it is transparent white. Blackoverprint also only is used for line work, typically text, and states that solid black objects are merged in overprint mode, even if they are generated as knockout objects in the job. Overprint_from_ job mode is an overprint mode as specified in the job itself. The particular RLE line work compression method used in the preferred embodiment includes the capability of such knockout specification.

An alternate embodiment to using the above-described ASCII text ordered lists of ordered lists to specify the page layout script is to use a page description script such as PDF by Adobe Systems, Inc. of Mountain View, Calif. PDF can include external page element references. Because PDF has been used for years and is well documented, it would be clear to one of ordinary skill in the art how to modify the system to incorporate using PDF or other techniques for specifying the page layout script.

Note that no limitations to the scope of the invention are implied by the particular script syntax used in the preferred embodiment. For example, where compressed bitstreams should be merged can alternatively be specified by a marker (when the compression format allows) or a pointer (kept separate from the format) or other means. The computational effort to find such a marker only depends on the specifications of the compression format to allow (aligned or non-aligned) markers. In the case of pointers, a bit pointer indicates the bit from where the bitstream should be merged. If more than one compression format is used to represent a page element, the same method and apparatus can be used for each compression format separately.

The Merge System 1015

The merge system is implemented as a set of computer programs that operate on processor 112. In particular, the computer programs include three threads that execute in parallel and that communicate with each other using standard interthread communication methods. Standard interthread communication methods as known to those of ordinary skill in the art of computer programming include shared memory, mutexes, signals, pipes, etc. In our implementation, the threads cooperate as source/drain pairs with a buffer (or more than one buffer) in the middle: the source thread tries to fill the buffer, and sends a signal to its associated drain thread each time data is written. If the buffer is full the source thread waits until the drain thread removes data from the buffer. In parallel the drain thread tries to empty the buffer, sending a message to the source thread each time it removes data from the buffer. If the buffer is empty it waits for a signal from its source thread that new data has been written.

The three threads with their associated buffers are shown in FIG. 1. The buffers all are implemented in RAM. The read thread 1105 reads the page layout script 1103 and sources merge thread 1109 via the page element cache 1011, which is the buffer between these two threads. Merge thread 1109, the drain for read thread 1105, also is the source for the output thread(s) 1113 via the page buffer(s) 1111. Note that more than one page buffer and more than one output thread are shown, and the system may have any number of each thread and its source/sinks. The object read thread 1105 fills the page element cache 1011 with the page elements that are needed on the next pages. The page elements are read from page element storage 1013 or from RIP system(s) 1009. As soon as all the objects (page elements) of a page are in page element cache 1011, merge thread 1109 merges the line work, CT selection mask and CT data, color separation by separation, and writes the result into the page buffer(s) 1111. Because of the printing head structure of the Xeikon printer, the embodiment for the Xeikon printing system has four output buffers per side of a page, one buffer per separation, and thus four output threads per side of a page. There are thus eight total output threads for duplex CMYK printing. Finally the output thread(s) 1113 forwards the merged data in page buffer 1111 to the decompression and screening system 1017. For the Xeikon system, there is at least one separate decompression and screening system 1017 for each color separation, thus at least four output streams.

Note that in some alternate implementations, for example, on a multiprocessor computer system, it might be advantageous to split one or more of the tasks performed by each of the threads above into multiple threads. A first example is the multiple output threads shown. In a second example, the merging tasks may be split into two merge threads, each taking separations from the same source, and writing the result to the same drain.

The Decompression and Screening System 1017

The decompression system decompresses the LW and CT data into separate CT and LW pixel buffers. If required, the CT pixels (resolution 300 dpi in our Xeikon based implementation) are scaled up to the device resolution (600 dpi for the Xeikon) by repeating pixels on a line and by repeating lines. The system then selects pixels from one or the other pixel buffer based on the CT selection mask for the merged data. The resulting final raster image is screened, and then forwarded to the print heads of the press 1019. Decompression and screening system 1017 also reduces the data depth to the data depth of the output device. At the final stage, the data rates explode to the full data rate of the printing device 1019. For this reason, in the preferred embodiment, we have chosen to implement the decompression and screening system 1017 as special purpose hardware. Decompression, screening, combining according to the CT selection mask, and buffering the data to the hardware likewise could alternatively be implemented on a small fast computer, or on fast microprocessors or on a DSP device. The present invention does not depend on any particular means (hardware and/or software) for screening or decompression and it is assumed that such functionality is available.

Each particular implementation may be varied to deal with the particular printing devices, and a universal implementation also is possible. One implementation is for the Xeikon printing device. This is a duplex printing device with four print heads (in order of printing, Y C M K) one each side, the print heads separated by 26 cm on each side. Our implementation for the Xeikon system has at least one decompression and screening system 1017 for each color separation for each side of a page.

The Rapid Merge System in Detail

Although not the only way of implementing these aspects of the invention, the rapid merge system in the preferred embodiment is built around a high performance assembler computer such as system 110 of FIG. 1, and uses a high capacity storage RAID system as one of the disk drives 146 (or the only disk drive 146) in file storage system 125. It is interfaced for high data rate output via a PCI bus to the special hardware decompression and screening system 1017 and ultimately to a digital printer 1019.

Figure 11:
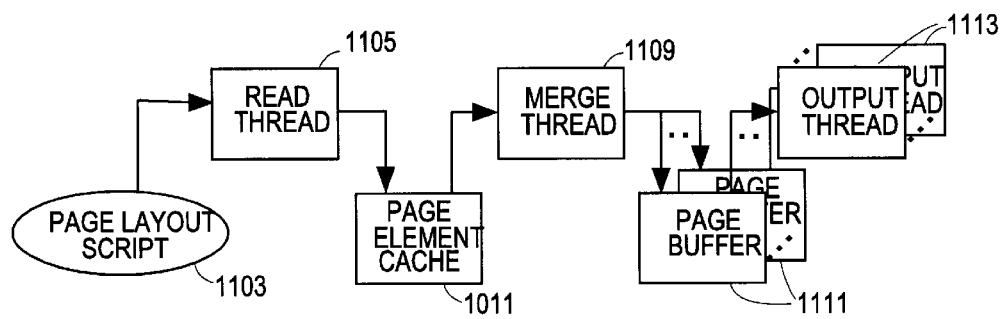
FIG. 11 shows three threads interacting, the threads being part of the rapid merge system in one embodiment of the invention.
Figure 12:
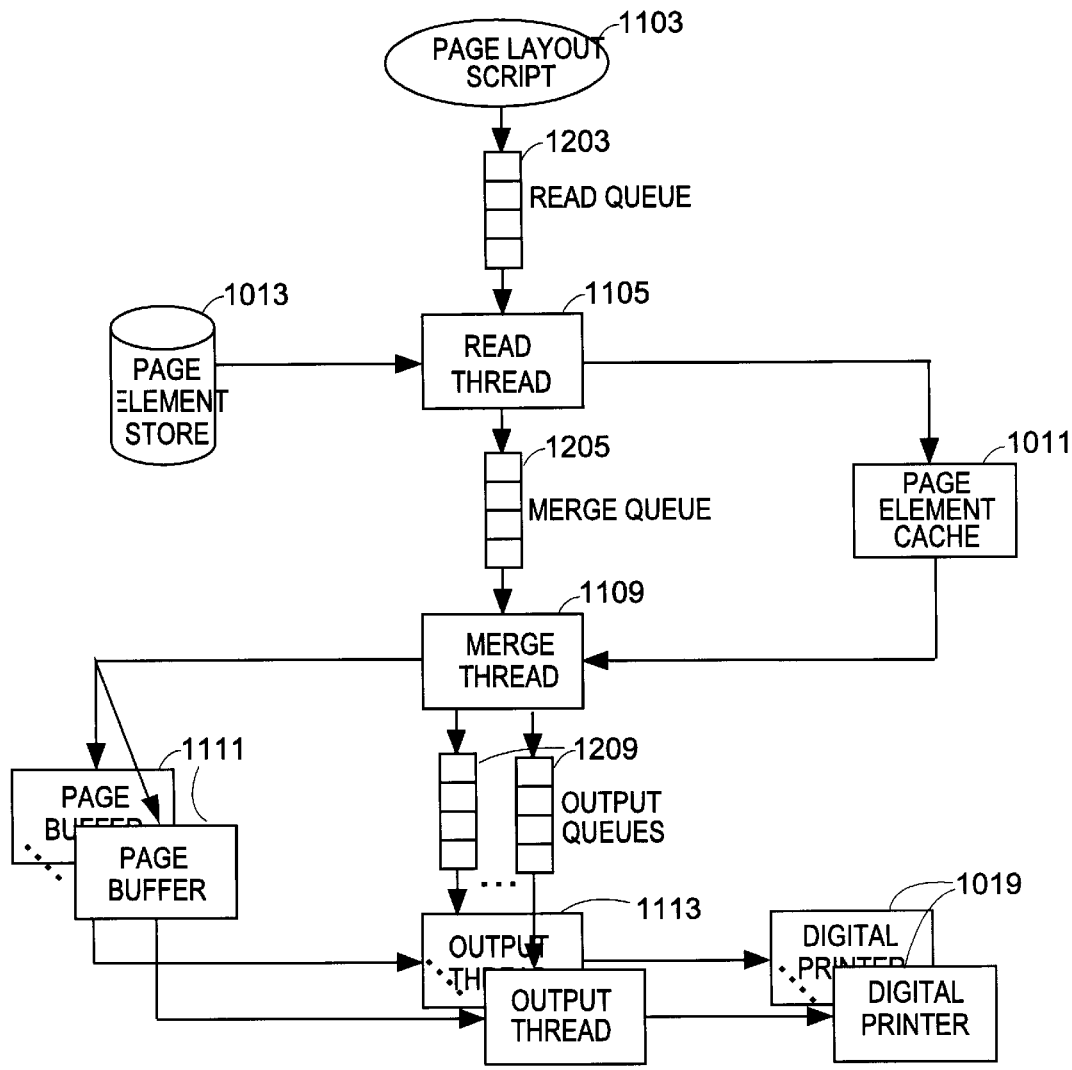
FIG. 12 shows an embodiment of the rapid merge system in greater detail.

The rapid merge system is now described in more detail with the aid of FIG. 12 which shows the operation of the three threads of FIG. 11 in more a more detail. The merging is primarily performed in software by assembler computer system 110 as the three threads, and these threads execute in parallel on processor 112 and cooperate in a pipelined fashion. The flow of operation is controlled by the page layout script, hereinforth denoted by reference numeral 1103, which controls all merging activity. For each page, page layout script 1103 contains a page description which details the layout of the page on the basis of page element placement. In particular, in our system, each page description is an ordered list of the page elements, in order. Each page element in turn also is an ordered list which comprises: the page element identifier, the file name (and page with the file) of the page element (for initial access in page element store 1013), the horizontal and vertical position from the origin, and the merge mode (knockout, overprint, etc.). The page descriptions are passed through the merging pipeline of threads. The threads work asynchronously and are separated by queues set up in memory 130 during an initialization operation. The queues thus hold those parts (or pointers to those parts) of the page descriptions necessary for inter-thread communications as the page descriptions are passed from one thread to the other so that each thread has the appropriate page descriptions to work with. Each thread also may modify some of the parameters of the page descriptions before passing the description on to the next thread whenever the circumstances warrant such a modification. For example, the file name and/or location of an element may be changed by a thread to speed up access for the next thread.

Internal Structure of the Page Layout Script

Figure 13:
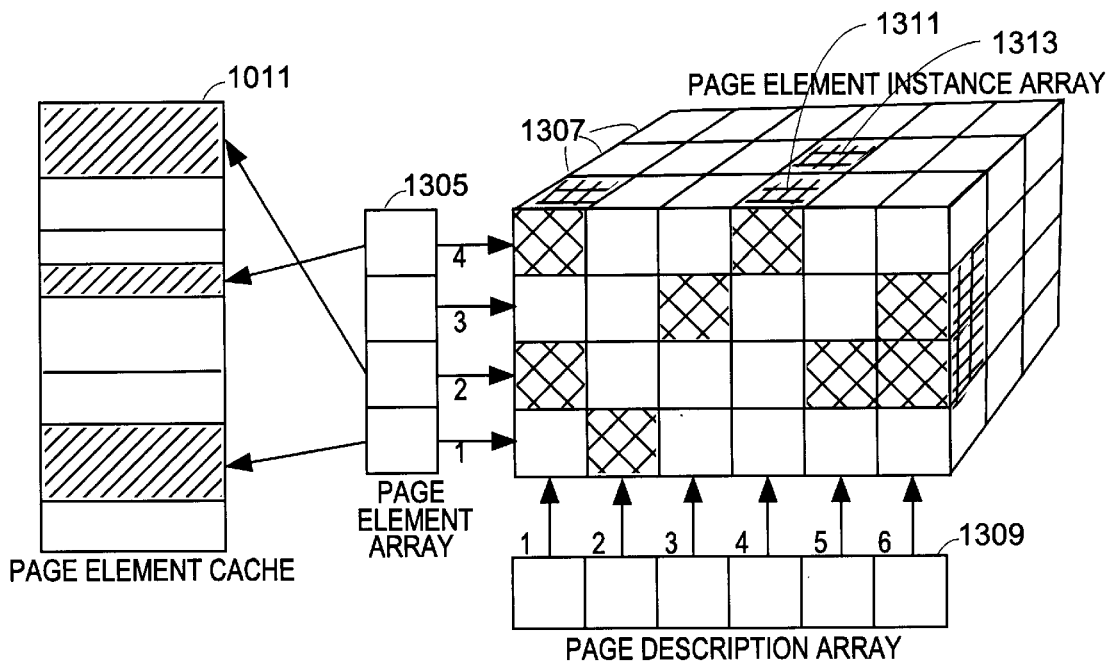
FIG. 13 shows the structures set up in memory for the page element cache, the page element instance array, the page element array and the page description array according to one embodiment of the invention.

The initialization step thus sets up all the necessary queues. For efficient processing, the page layout script which in the preferred embodiment is in the form of an ASCII string of lists of lists, or in alternate embodiments, a PDF or similar description, also is parsed during initialization and then transformed into a set of more suitable data structures. This data structure set is designed for more efficient page element control management, and is accessible to all the threads at any time. During the parsing of the layout script, all relative non absolute positioning information for any page element, such as "Center," "Left," etc., and all relative distances from other page elements, are calculated and only absolute positioning is used in the data structure set. The particular data structure set used in the preferred embodiment is shown in FIG. 13 and includes a three dimensional page element instance array 1307 and two one-dimensional arrays called the page element array 1305 and the page description array 1309. The three-dimensional page element instance array 1307 is used to hold instances of page elements. An instance (i.e., an array element being occupied) is depicted by the array element being cross-hatched in FIG. 13. The dimensions are horizontal (rows) from left to right, vertical (columns) upwards and depth (perpendicular to and into the page on which FIG. 13 is printed). Thus, the top left front element 1315 is occupied. There is a row for each page element in the book of pages. Thus, the number of rows in the columns of instance array 1307 is the total number of distinct page elements in the book, four in the example of FIG. 13. Each column describes the layout of a particular page. Thus, the number of columns in instance array 1307 is the number of pages in the book, 6 in the example of FIG. 13. The third dimension deals with the case when there are several instances of the same page element in any particular page. For example, element number 4 occurs twice in page 4 as indicated by the cross hatches 1311 and 1313, instance 1311 occurring before instance 1313. Thus the total depth is the maximum number of instances of any page element in any page of the book, and is 3 for the particular instance array 1307 of FIG. 13. Clearly, not all entries in instance array 1307 are occupied. In fact, typically, only a few of the entries of instance array 1307 are occupied, i.e., the instance array is sparse. Efficient storage techniques are known for reducing the amount of memory 130 required to store sparse matrices such as instance array 1307, and such sparse storage techniques are used in the preferred embodiment. Each occupied cell, i.e., each instance in instance array 1307 includes some attributes, and the attributes of each page element instance are shown in Table 2, and include for this instance, the element's position, printing mode, printing order, and the number of the page where the next instance of the element is. This last field refers to the next page after the present page of the instance where the page element is reused. If the present instance is the last instance for the page element, a special value is used for the "next page" field to indicate this fact. The information in this field is used by the caching system to decide which page elements have to remain in the page element cache when a page is merged.

Some attributes of the page elements themselves are stored in memory 130 in a separate one-dimensional array, page element array 1305. The attributes of a page element stored in element array 1305 are shown in Table 3 and include the element's file name (and if applicable, page within the file) as used in page element store 1013, a flag that indicates whether the page element is in page element cache 1011, the address where the page element is stored in the page element cache in the case that it is in the cache (i.e., in the case the flag is set), the page number (or other page identifier) of the page where the next instance of the element is used, and an index of the row in the element instance array 1307 that corresponds to the page element. The attributes of the pages in a book are stored in memory 130 in the form of page description array 1309. The attributes of a particular page in page description array 1309 are shown in Table 4 and include the page's width, height, place in the buffer space (called the output buffer) that includes page buffer(s) 1111, where the merge result is stored by merge thread 1109 and the index (as an identifying number) of the column of page element instance array 1307 that corresponds to this page.

TABLE 2

| Page element instance fields | Value/data type |
| --- | --- |
| X position | (a number) |
| Y position | (a number) |
| Printing mode | <overprint/masking/...> |
| Printing order | (a number) |
| Next page used on | (a number) |

TABLE 3

| Page element fields | Value |
| --- | --- |
| File name | (a string) |
| Cached | <True/False> |
| Place in cache | (an address) |
| Next page used on | (a number) |
| Index page element instances row | (a number) |

TABLE 4

| Page description fields | Value |
| --- | --- |
| Width | (a number) |
| Height | (a number) |
| Place in output buffer | (an address) |
| Index page element instances column | (a number) |

The Read thread

Now that we have described the internal storage structures of the page layout script, the operation of the threads will be described in more detail. Recall that after initialization, the instance array 1307, page element array 1305, and page description array 1309 together contain the page layout script, and that these structures are available to all threads at all times. Once arrays 1307, 1305, and 1309, and the needed queues have been set up during initialization, a read queue thread 1203 is loaded with pointers to the pages that are to be processed, in the order of printing such pages.

The first job of read thread 1105 is to pre-fetch page elements from page element store 1013 and put them into page element cache 1011 as necessary. Initially, the first page description pointed to by the read queue 1203 is used, and based on the entry in the page description array 1309 for a particular page, the required page elements to be loaded are determined from the instance array 1307. Required information for loading the page elements into cache 1011 is obtained from the page element array 1305 where, initially, the page elements are referred to by file name. With such information, read thread 1105 knows what page elements to pre-fetch and where they are stored in page element store 1013. Before pre-fetching any page element, the read thread checks whether the page element is already in page element cache 1011 by checking the "Cached" flag in page element array 1305. If this flag is set, no access from page element store 1013 is needed. Otherwise place is allocated in page element cache 1011 and the page element is stored there. After the fetch, the "Cached" flag is set and the "Place in cache" address is written in page element array 1305. Only the first instance of any element is dealt with by read thread 1105 because its job is only to ensure that the elements required by any page are in page element cache 1011. The "depth" dimension of the instance array (the dimension dealing with multiple instances on a page) is not dealt with. Once all page elements in the page description of a particular page are processed, a pointer to the page information entry in the page description array of the completed page is passed to another queue, the merge queue 1205, which also is set up in memory 130 during initialization. This indicates to merge thread 1109 that the elements for that page are available. Merge thread 1109 can then work independently of read thread 1105. Separately, a memory management process described hereinbelow makes sure that elements not yet merged by merge thread 1109 are not removed from the element cache 1011 prior to merging. Thus, when page element cache 1011 becomes full, special action is required as described further on herein.

Cache memory management

Page element cache 1011 comprises a chunk of memory in memory 130. A dynamic memory manager system handles requests from read thread 1105 for a block of memory of a size corresponding to the size of a page element. To prevent cache fragmentation, the page element cache is divided into fixed size chunks (memory pages), and a block thus consists of a number of those chunks. These chunks are not necessarily contiguous in the cache memory. Once the block is allocated, read thread 1105 reads the page element from page element store 1013 into this block When a page element is no longer needed on subsequent pages, as indicated by the appropriate flags in the three array data structures, it is de-allocated by the cache dynamic memory manager under control of the merge thread 1109. Various implementations are possible and may be found in the prior art literature for the dynamic memory manager. When a request for a block of memory is made by read thread 1105 and the dynamic memory manager cannot fulfill the request, i.e., the cache is full, the read thread 1105 is blocked from writing into the cache 1011 until merge thread 1109 starts merging the page elements on the previous page or pages. As merge thread 1109 advances while read thread 1105 is blocked, page elements can become de-allocated from the cache because they are not needed for future pages. Only then is read thread 1105 given a signal to go ahead, and the memory request is thus attempted again. When the memory request succeeds, read thread 1105 can proceed. If read thread 1105 is still blocked when merge thread 1109 starts merging one page prior to the page read thread 1105 is attempting to pre-fetch pages for, a cache replacement strategy comes into effect.

The Cache Replacement Strategy

One aspect of the present invention is for a method (strategy) for replacement of page elements in element cache 1011 when it becomes full and simply waiting will not work. This replacement method minimizes accesses to page element store 1013 and hence maximizes throughput.

During initialization, the size of page element cache 1011 is dimensioned so that all page elements of two consecutive pages will fit in it. In this way the cache replacement will never stall. The replacement method comprises a set of actions performed to uncache certain elements from page element cache 1011 so that sufficient space becomes available to allocate the memory needed to load a certain page element from page element store 1013. A page element is uncached by setting its "Cached" field to false in page element array 1305 and by releasing the memory occupied by the page element in page element cache 1011 according to the dynamic memory manager.

One simple replacement method is scanning through page element array 1305 and uncaching cached page elements in a random manner, the uncached elements not being on the page presently being operated on by merge thread 1109 (typically the page prior to the page presently being operated on by read thread 1105) and not being on the page presently being operated on by read thread 1105. The uncaching of such elements is performed at random until the memory request can be satisfied.

One disadvantage of this simple replacement method is that potentially page elements could be uncached that might be needed soon. Similarly, page elements that are reused only much later may unnecessarily remain in cache 1011. The preferred embodiment cache replacement method ensures that page elements are uncached in reverse order to how many pages ahead they are needed. That is, the elements needed later are uncached first. To achieve this, the preferred embodiment page replacement method makes use of the field "Next page used on" of page element array 1305. This field is filled in by read thread 1105 when a page element is read into page element cache 1011, and is copied from the corresponding page element instance field in element instance array 1307. The specific cache replacement strategy now examines this "Next page used on" field and selects all page elements in element array 1305 that have "Cached" flag True and that have "Next page used on" field with pages after the page read thread 1105 is pre-fetching page elements for. All so selected page elements are sorted in descending order of their "Next page used on" field. The preferred cache replacement strategy then uncaches page elements according to the sort order. In this way the optimal cache replacement is achieved.

Merge thread 1109 and the Output Thread(s) 1113

Merge thread 1109 is the core of the rapid merge system 1003. It also runs on processor 112 and executes the implementations of merging methods of the present invention which perform the merging substantially in the compressed raster image domain. The activity of merge thread 1109 is controlled by information referenced in array structures 1307, 1309 and 1305 by page descriptions that are pointed to by merge queue 1205. Using the referenced page descriptions, merge thread 1109 knows where to find the page elements in page element cache 1011 and where to place these page elements on the page. Merge thread 1109 generates all the page separations in compressed format as specified in the set of data structures. It does this separately for CT elements (in the preferred CT compression format JPEG) and the LW elements (in the preferred LW compression format RLE). Typically, for ultimate printing on the Xeikon duplex device, 16 merge results are calculated for each final duplex page: for the front and back sides of the page there are the CMYK separation each in both CT and LW compressed format. The merging results from merge thread 1109 are stored as page buffer(s) 1111 in the output buffer which uses part of memory 130 and which holds the pre-merged pages that are output to the decompression and screening system(s) 1017 by output thread(s) 1113. The number of page buffers and output threads depends on how the data is printed on the particular printing device. Once all the page merge results for a particular page are calculated, the appropriate "Place in output buffer" field in the page description array 1309 is filled in by merge thread 1109 with references to the merge results in page buffer(s) 1111. The pointer to the page description of the page is placed in one or more corresponding queues called the output queues 1113, the queue originally set up in the initialization phase. Each queue indicates to its output thread 1113 that the page data for this page (and this separation in the case of separate page buffers and output threads per separation) as referenced in the page description array 1309 is ready to be processed by the output thread 1113, which outputs the page merge results to the appropriate decompression and screening system 1017 where they are decompressed, combined, screened and sent to the appropriate print heads 1019 of the printing device. Note that on FIGS. 11 and 12, the reference numeral 1019 is used interchangeably for the printing device and/or print heads of the printing device. The particular meaning would be clear to the reader from the context. The pace at which any output thread 1113 operates is determined by the speed the digital printer outputs the pages. It should again be noted that for printing on the Xeikon or other printing devices that have multiple print heads that put the color separation components on the page in a pipelined fashion one after the other, where the output queue is split into multiple parallel output queues that feed each of these print heads, merge thread 1109 puts an appropriate page description pointer in all these queues as it calculates merge results.

In order for the herein-described merging system to operate in real time as dictated by the speed of digital printing device 1019, it is necessary that the read, merge and output threads keep up. The required throughput (as counted in pages) of each thread relates directly to the complexity of the page layouts. This complexity in general is proportional to the number of page elements and their size, on a page. In the case that the required throughput can not be achieved, if there is no way to instantaneously slow down or stop and start digital printing device 1019, some blank pages will be output. For printing devices that can be slowed down, when the required throughput can not be achieved, such a printing device may be forced to run at a slower speed.

Alternatively, the page layout script generator can check the complexity of the page layout and give warnings to the operator if a particular page is likely to be too complex to pass to the merging system. The operator can then be given a choice to pre-merge these pages off line, or to partially merge some of the page elements of such a page.

The Page Buffers (also called Page Separation Buffers) 1111

In the current context the memory area occupied by one compressed page in the output buffer is defined as a page buffer 1111. This is to use the same terminology as in prior art systems that use uncompressed page buffers of fixed size at fixed allocation.

Page (separation) buffer(s) 1011 is/are where the merge results are stored. Each page result (a separation in our implementation) is stored in a corresponding page buffer Hence, an alternate name (for our implementation only) is page separation buffer. One page buffer stores both the CT and LW of the page. For a printer that outputs pages sequentially, putting all separations on one page before starting with the next page, one page buffer would store all separations for that page. Printers that output separations in a pipelined fashion, outputting different separations of different pages at the same time, one page buffer 1111 would store only one separation of the page and thus sometimes is called a page separation buffer. In the latter case there are multiple output streams, one for each separation (and print head of the printing device), there also are multiple page separation buffers 1111 coupled to corresponding output queues 1109. For each output stream a number of page (separation) buffers may be allocated in a memory area of fixed size. In the preferred embodiment, this memory area can store at least two page (separation) buffers 1111 per output queue 1009. Depending on the compression ratio of the pages, usually a lot more page buffers might fit, and this enables the system to flatten peak loads. The merge thread writes the page (separation) buffers 1111 one by one in the output buffer area, and forwards their reference via the output queue to the output thread. The output thread then forwards the page (separation) buffers to the decompression and screening system 1017.

Two common methods to put merged page elements into a page buffer are: 1) paint the page elements one by one in the page buffer, according to drawing order; and 2) calculate the paint result of the page buffer scanline per scanline or strip per strip. The second approach often is preferred when merging uncompressed data because memory requirements are high and often a complete buffer for a merged page may not fit into memory. In our case, the data put into page buffer 1111 is in the compressed domain, and the whole of page buffer 1111 (which as discussed earlier is pre-designed to store two pages) remains in memory 130. Nevertheless, the second approach is preferred. This is because the first approach requires memory management overhead. Contrary to an uncompressed merge, it is not possible to paint (merge) a single page element into proper merged results in-place in the page buffer because the storage size of a compressed page changes as page elements are merged onto it. So either the system must move a lot of data, or it must work with reference pointers to new data at another memory location without being able to release the memory occupied by invalid data. Thus, a lot of memory management overhead would be required. The second approach does not have these problems and therefore is used in the preferred embodiment.

Memory management for page buffer(s) 1111 is now described. The merging result is calculated by merge thread 1109 in strips that correspond to a height of 8 CT pixels (because CT merging preferably is carried out on 8*8 JPEG blocks). The memory for page buffer 1111 is allocated by a page buffer memory manager as strips are merged, according to the maximum size a compressed strip can reach based on a worse case assumption of the lowest compression ratio. The page buffer memory manager typically works in round robin fashion allocating and de-allocating buffers in a reserved memory area which is dimensioned large enough during initialization to hold a chosen number of compressed page buffers 1111 (two in our preferred embodiment). Each page buffer is implemented as a circular buffer (also sometimes called a ring buffer). When a strip is completely merged, the excess memory allocated is returned to the page buffer memory manager. Also when the merged page contents of a page buffer are output to decompression and screening system 1017 by output thread 1113, the memory occupied by that page buffer is returned to the page buffer memory manager. When all page buffers 1111 are filled, merge thread 1109 is blocked until the output thread releases a page buffer.

Merge thread 1109

As merge thread 1109 takes a page description based on the pointer in merge queue 1205, it starts merging page element instances. In particular, merge thread 1109 merges the page separations one after the other in one of the page buffers 1111 (assuming more than one page buffer). The CT parts and the LW parts (each compressed) are separately merged for each separation and stored in the same page (separation) buffer 1111.

Merging is carried out by merge thread 1109. Conceptually, the preferred methods for merging the CT part and the LW part of a page element are similar in that the merge result is calculated in strips, preferably 8 CT pixels (=16 LW pixels for the Xeikon) high, that divide the page horizontally. Page buffers are allocated to each page of the separation by the page buffer memory manager as described above. The page buffer is written strip by strip. That is, initially, the maximum possible memory size for a strip is allocated, and after the strip is merged and the actual size is known, extra memory is de-allocated. The merge result for a strip is calculated scanline by scanline. For the JPEG CT compressed merging a scanline is a strip, i.e., a row of 8×8 blocks, while for RLE LW compressed merging a scanline is one LW line so there are 16 scanlines per LW strip. Once all the strips in a page are merged, the starting addresses of the pages are recorded in the appropriate "Place in output buffer" fields in page description array 1309. For each duplex page, if there are eight page buffers (e.g., one for each print head), there would be sixteen different sub-fields indicating the start addresses for LW data and for CT data for each head. Note that several alternate implementations are possible for this field. For example, in one alternate, the "Place in output buffer" field includes one pointer per separation to the first strip of LW (or CT) separation, other strips stored consecutively. For this to work, strips are stored so that the start of the next strip can be determined. Another alternative is to use an array of strip descriptions with the start location and size of each strip in the array. Many other variations are possible, as would be clear to those of ordinary skill in the art.

Thus, another aspect of the invention is a method implemented in merge thread 1109 for efficiently generating the compressed page starting with compressed page elements, any merging carried out substantially without decompressing the page elements. The process of merging page elements on a page in compressed form resulting in a single compressed page element, this being the whole page, proceeds according to the following pseudocode, which operates for each strip for each separation:

```
    sort the page elements according to their y position on a y-stack,
    topmost element first;
    calculate the merge result of each scanline from top to bottom;
            as page elements intersect the current scanline pull them
        from the y-stack and put them on a second stack (an x-stack);
            remove page elements from the x stack that don't intersect
        with the current scanline;
            sort the x-stack according x position, leftmost element
        first;
            if the x-stack is empty, insert a blank line and continue
        with next scanline;
        pull a page element from the x-stack and put it on a third stack
(a z-stack), call its starting position x;
            if x is positive insert a blank piece till minimum x and
        width of page;
            calculate the merge result of one scanline from left to
        right;
                    pull all other elements from the x stack on the z-
                stack that start on position x;
                    call the starting position of the top element on the
                x-stack xn or set xn to the page width if the x-stack is
                empty;
                    sort the z-stack according to the page element drawing
                order, lowest element first;
                    find the smallest x end position of the elements on
                the z-stack, call it xl;
                    for each page element on the z-stack, from lowest to
                highest;
                        get a piece of the page element line that lays
                    on the current scanline, this piece of line goes
                    from x to the minimum of xl and xn;
                        clip this piece to left or right page border;
                        merge this piece on the page;
                        remove the page element from the z-stack and put
                    back on the x-stack when the end of the merged
                    piece is the end of the page element line;
            if the z-stack is empty, insert a blank piece from xl to xn
        and set x to xn else set x to minimum of xl and xn.
```

The Merge Process

Figure 2A:
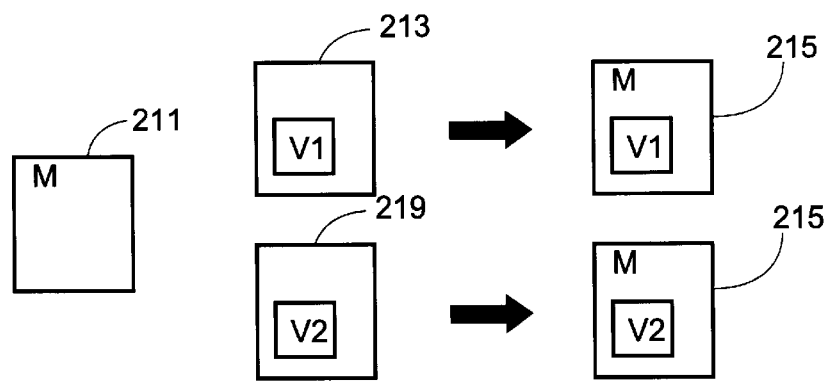
FIG. 2(a) illustrates a technique of a master page onto which a variable page (two instances are shown) may be merged. The merged result is the page with variable element V1 merged in one case, and the page with variable element V2 merged in another case.
Figure 2B:
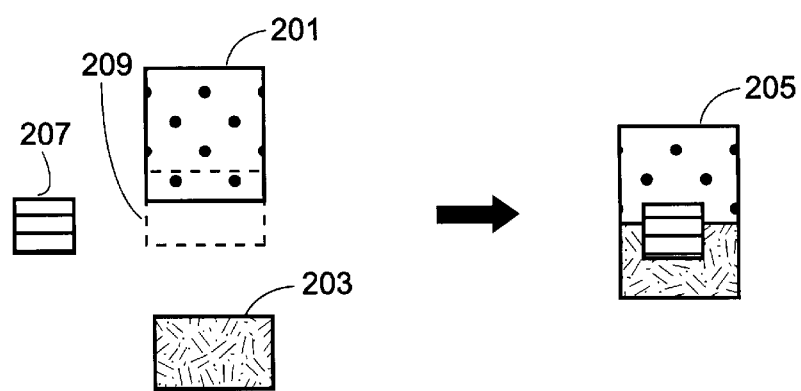
FIG. 2(b) illustrates an example of using a flexible technique applied to three page elements which are merged, resulting in a merged image. There is no concept of a fixed master page onto which variable elements are merged, although these concepts may be accommodated.

The merge process performed by merge thread 1109 is now described in detail. Although the operation in the preferred embodiment is merging all the elements at once, strip by strip, separation by separation, the description hereinunder will be for a simpler situation shown in FIG. 2(*b*), with only 2 elements, and how to add the details necessary for merging of multiple elements strip-by-strip will be left as a straightforward implementation detail. For the example, the page layout script would specify that the order is that element 201 is under element 203, and the location of merging element 203 would be specified relative to the position of element 201. In a system which uses the concept of a non-variable master and variable components, element 201 might be the non-variable master, and element 203 one of the variable elements. Note that the present invention in general does not have the concepts of "master" and "fixed" elements, and clearly can be adapted to include such concepts. The identifiers and positions of the page elements 201, 203, and 207 in the merged data 205 which are to be included in the compressed merged data and the ordering of the merging are specified and available to merge thread 1109 as described above. In the preferred embodiment, the merged data 205 represents data from strips of a page element into which one or more selected corresponding strips of page elements 203 are to be merged with a page element 201.

The data in element 201 and element 203 comprise images which may be line work and/or continuous tone ("CT") images. Line work as used herein includes text. Both line work and CT images are described by picture elements ("pixels"), and the pixel values are generated from the PDL description by RIPing at the resolution appropriate for the printer being used for printing merged data. As described above, the various page elements are available in a form of after RIPing but before screening. That is, the page elements are a raster of pixels, each pixel including the ink values for color printing, for example, CMYK values representing the amounts of cyan, magenta, yellow and black ink for printing. According to the preferred embodiment of the invention, the elements 201 and 203 are provided to merge thread 1109 in compressed form. The method and apparatus disclosed are not restricted to a particular compression format. They can be used with any compression format as long as the format allows insertion of bitstreams representing compressed image representations into a similarly formatted bitstream.

Merging of Continuous Tone Data

The first case considered is when page element 201 called element "E" and page element 203 called element "D" are both CT images. These CT images would each have associated with them a CT validity mask and LW data which would include a CT selection mask. Unless otherwise made clear, in this simplified discussion of the merging of CT data, it is the CT data as defined by the CT validity mask that is to be merged, and the CT validity mask defines the border (frame) of CT data being merged. The CT selection mask defines the border of the visible CT data being merged, albeit at the resolution of LW data. When merging CT's, only the CT validity mask comes in effect. After merging one CT E (say 203) on top of another CT D (say 201) through the CT validity mask of D, the CT validity mask is no longer needed. What happens to the CT selection mask after merging two page elements is described in the section on LW merging. The CT selection mask only comes into effect when combining the final merged CT and final merged LW of all the merged page elements. An important distinction between the CT validity mask and the CT selection mask is that the former is at the CT resolution and the latter is at the LW resolution. Furthermore the CT validity mask may validate more of the CT data than is selected by the CT selection mask, but all selected CT data should be validated. An example is shown in FIG. 9 where small LW text ("T" 907) is on CT area 909 in the same page element 903. The portion of CT data 911 which is under LW text 927 would be validated, but not selected, as is shown by CT validity mask 933 and CT selection mask 943. This aspect of the present invention enables faster CT merging and reduction of compression artifacts due to less CT border involved in the CT merging process. In the preferred embodiment, CT elements in pixel form (e.g., after RIPing) are compressed using JPEG. That is, CT elements are divided into blocks, each block corresponding to a rectangle, preferably 8 by 8 pixels. In the simplified illustrative example shown in FIG. 3, CT page element E, now denoted 301, is 5 by 5 blocks; and CT page element D, now denoted 303, is 2 by 2 blocks. Clearly, actual page elements are much larger. However, when strips are being merged strip-by-strip, each strip is only one block high. The blocks of page element E (301) are numbered E1,1 to E5,5, and those of page element D (303) are numbered D1,1 to D2,2. The convention used is that the first index represents the row number of the block, and the second index represents the column number of the block. It should be clear to those of ordinary skill in the art that in the preferred embodiment, only 1 block-high strips are being merged. The discussion below will in general talk of merging complete two dimensional page elements.

Figures 3, 4:
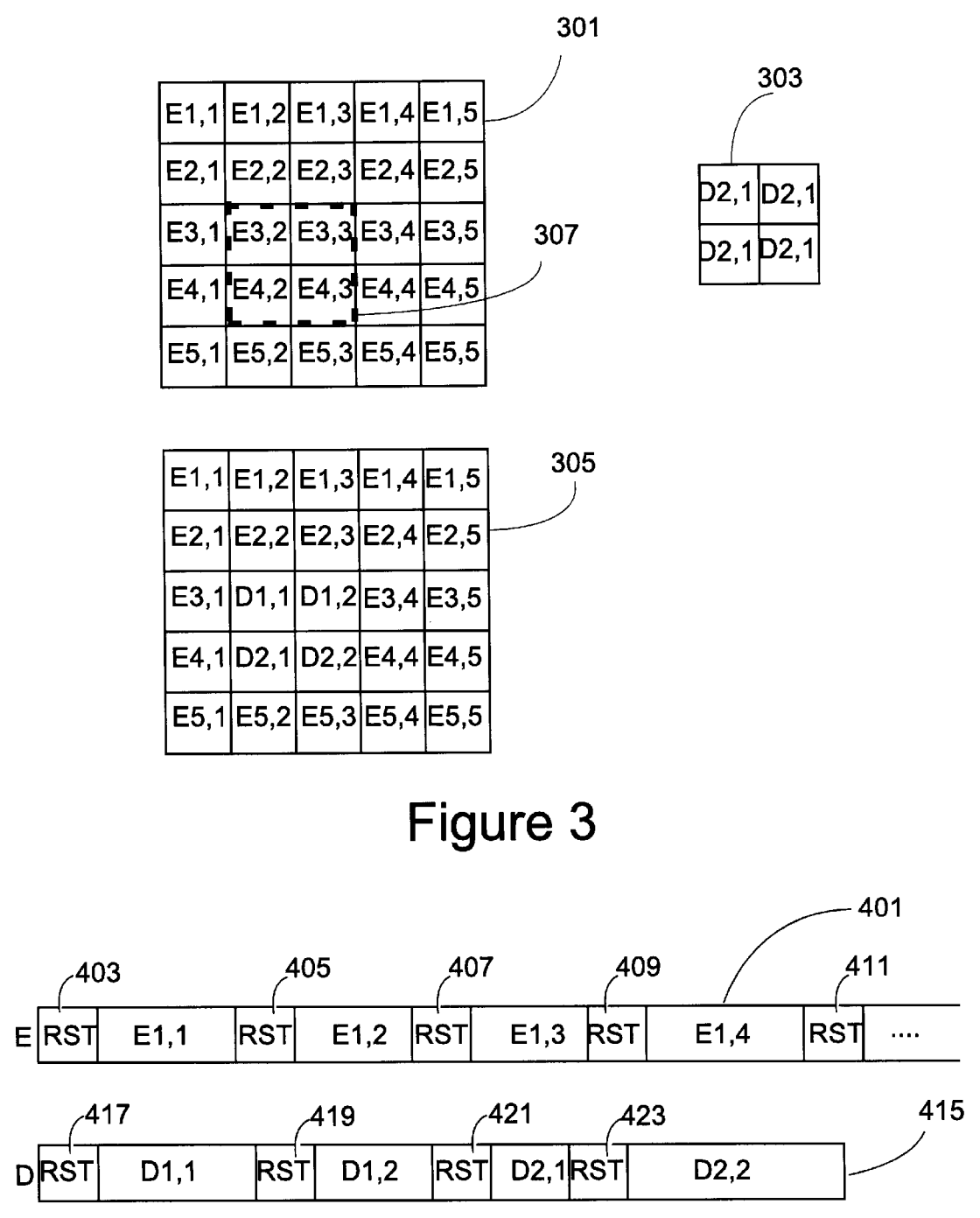

Note also that in the simple case illustrated in FIG. 3, the page element D 303 is rectangular, the part of element D 303 to be merged with a part of element E 301 is an exact number of blocks, and that part is merged at a location which in relation to element 301 is at exact block boundaries of page element 301. This is the simplest case. When one knows the complete work flow ahead of time, merging preferably is pre-arranged to guarantee that the merging will be in block boundaries. In another aspect of the present invention, recall that each CT element has an associated CT validity mask and CT selection mask that together define which part of the image is visible. These masks are not necessarily rectangular—they can take any form, for example, a circle. Also, in general, page element 203 can be placed at any arbitrary position 209. Hence, the blocks of page element 201 in general will not align with those of other elements.

In JPEG compression, each image is broken up into blocks, and the DCT coefficients for each block are quantized, for example, using digital pulse code modulation, run length coding and Huffman coding. The representation of the different compressed blocks after Huffman coding may have different lengths (in bits).

The JPEG format allows each encoded block to be preceded by a special 16-bit aligning (also called restart marker) denoted RST. This 16-bit aligning marker eases the searching across a bitstream; one searches for the special 16-bit RST value, comparing each 16-bit word of the bitstream. Referring again to the simplified case of FIG. 3, by preceding each encoded block by such a marker, the images E (301) and D (303) are stored in the form of a data stream which is a sequence of block representations, each starting with an RST marker. This is shown in FIG. 4, where example page element E (301) has RST markers 403, 405, 407, 409 and 411 before each block, and example page element D (303) is shown to have RST markers 417, 419, 421 and 423, before each block. Alternatives to having every block be preceded by a RST marker also are desirable, and described further later in this document.

Figure 5:
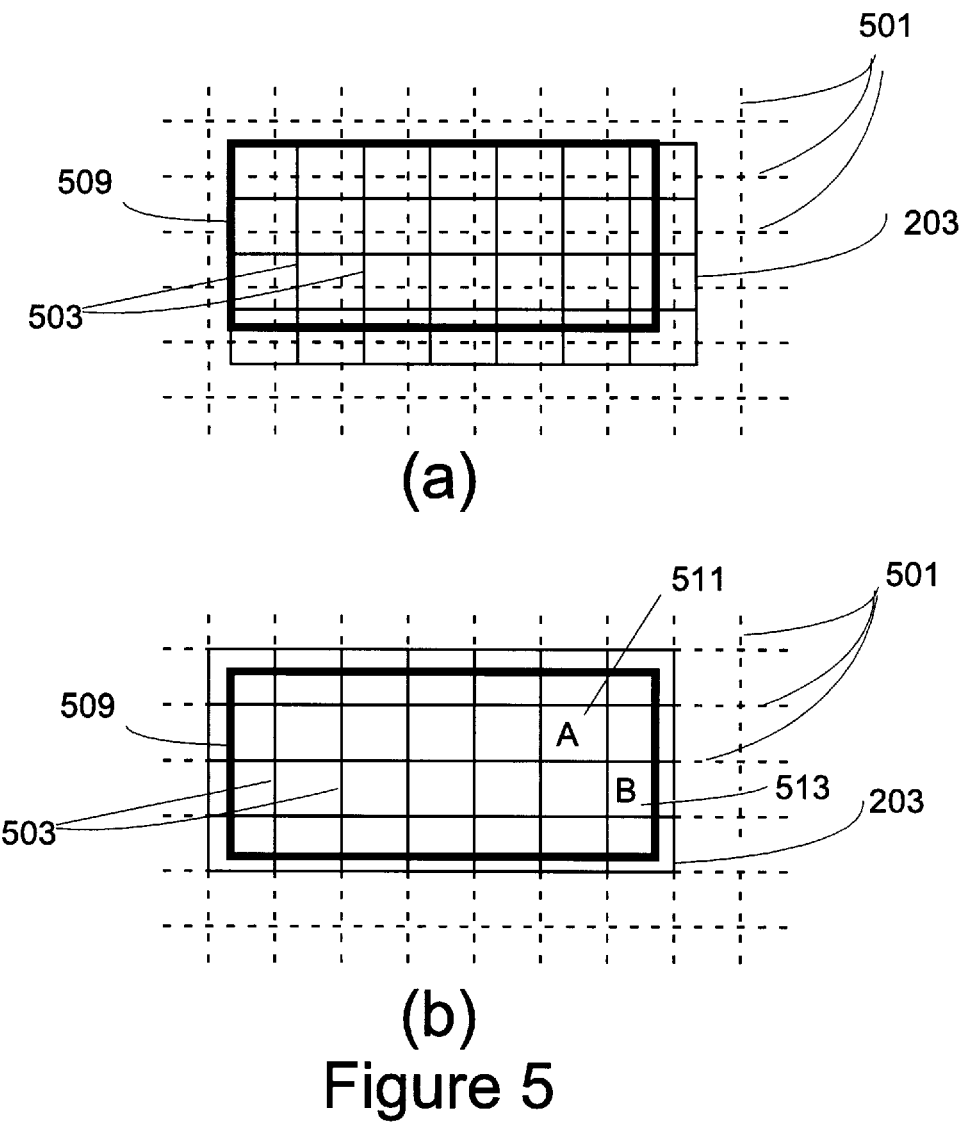
FIGS. 5(a) and 5(b) show aligning block boundaries of CT images for merging according to one aspect of the invention.

In the preferred embodiment, for the CT case, when the blocks of the underneath E page element 201 do not align with those of the on top D page element 203, which often will occur, the E and D blocks of 201 and 203 are aligned prior to merging. The blocks of D page element 203 are aligned to the grid defined by the blocks of E page element 201 by performing a translation of D page element 203 over the smallest possible distance to align the D blocks of element 203. This is shown in FIG. 5(a) and FIG. 5(b). The block boundaries of the E (underneath) page element 201 are denoted 501 and shown as dotted lines, the blocks of the D page element 203 are denoted 503, and CT validity mask of D page element 203 is denoted 509. In FIG. 5(a), the situation prior to translation is shown. The shortest distance to align the D page element 203 to the block boundaries 501 is to translate D page element 203 up and to the left. FIG. 5(b) shows the images aligned after such translation. In the preferred embodiment, the pixel blocks 503 of D page element 203 are moved and CT validity mask 509 is not moved. The effect of this is that the position of the D element 203 relative to other page elements in the page (such other page elements not shown in FIG. 5) does not change. As a result, visual alignment with other page elements is preserved.

In the case of the 8×8 blocks of the JPEG embodiment, the maximum translation is 4 pixels in the vertical and/or horizontal directions. At a CT resolution of 300 pixels per inch, common in high quality publishing, this translates to a maximum shift of about 1/75 of an inch or about 1/3 mm.

Figure 6:
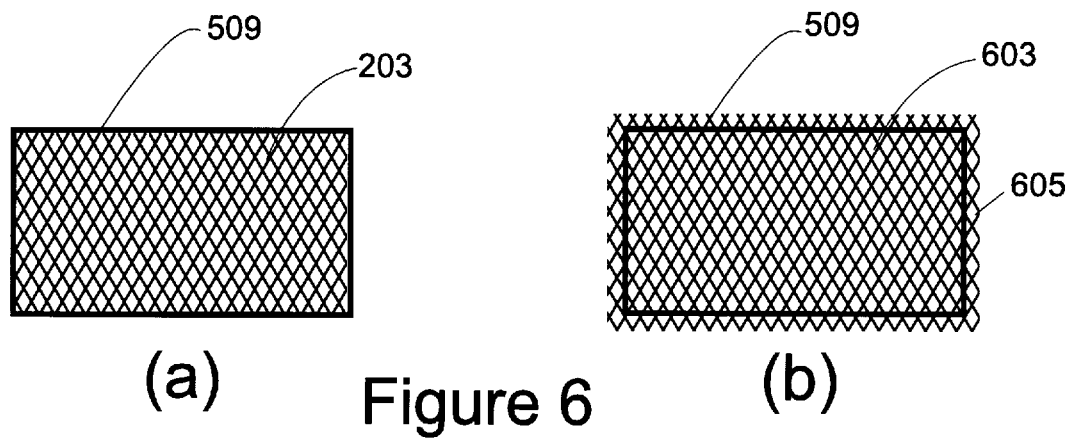
FIGS. 6(a) and 6(b) illustrate enlarging a CT image prior to merging according to another aspect of the invention.

As a result of translating D page element 203 with respect to CT validity mask 509, some of the pixels that were outside CT validity mask 509 get inside the CT validity mask and become visible. If CT validity mask 509 is close to or at the edge of page element 203, artifacts may appear after translation. To avoid such artifacts, a border of at least 4 pixels of D page element data must be available around CT validity mask 509 to allow block alignment. In another embodiment of the method of the invention, whenever image CT validity mask 509 of page element 203 is close to the boundary of page element 203, for example, the boundary box of D for a rectangular image, the image is enlarged by a small factor to create a border of 4 pixels around image CT validity mask 509. Such enlarging normally would be done during RIPing as instructions to enlarge the image when both the CT validity mask and the CT data are available. An example of such an enlarging is shown in FIG. 6. FIG. 6(a) shows image CT validity mask 509 as being the same size as page element 203. The situation after enlargement and before displacement is shown in FIG. 6(b). Page element 603 is a slightly enlarged version of page element 203 with a border 605 of 4 pixels outside CT validity mask 509.

In the particular RIP implementation used with the preferred embodiment, the RIP usually has 2 files for each page element: the PS file itself, and a small text file with RIP options (duplex or not, orientation, CT handling, etc.). With such a RIP, the text file can inform the RIP when an object to be RIPed will be used as "variable" data. When the RIP encounters a CT, it examines the current CT validity mask and CT selection mask. The intersection of the bounding box of the CT and the bounding box of the validity mask and clip mask is determined. At each side (top, bottom, left, right) there should be at least 4 CT pixels between this intersection and the CT selection and clip mask bounding box to account for possible translation over a maximum of 4 pixels. If the distance is less than 4 pixels, the CT is scaled and repositioned by the RIP in such a way that a border of 4 pixels is available on all sides. In another embodiment the RIP would not scale the CT but duplicate (or extrapolate) CT pixels beyond the border of the CT validity mask as to ensure that for arbitrarily shaped validity masks a margin of 4 pixels outside the CT validity mask is present.

Sometimes the position of a page element on the final page (relative, for example, to some common page element acting as a "master") is known in advance. If this is the case, the JPEG blocks can be generated in such a way (by the RIP) that they align with the "master," eliminating the need for alignment during the merge phase. If no alignment is needed, the size increase step in the RIP can be omitted.

If the PS file is sent from a standard prepress application program directly to the RIP, using, for example, the standard installed PostScript driver, then one still may incorporate such options based on a printer definition ("ppd") file, using, for example, the "setpagedevice" options. Such implementation would be clear to those of ordinary skill in the art of prepress programming and PostScript RIPing. A special processing option (set by the user) informs the RIP that it is processing a variable page element.

Often in practice, many images are cropped for design reasons, such cropping itself defined by a mask. In such a situation, the cropping mask is used as CT validity mask 509 and a border already is available, so that, in another embodiment, the RIP for generating page element 503 does not apply the extra scaling.

In the remainder of the description herein, whenever merging of CT image D 203 is described, it will be understood that if enlargement has occurred, the merging is of enlarged page element 603, rather than of page element 203 even though this is not explicitly stated.

As can be seen in FIG. 5, some blocks of page element 203, for example, the block labeled A and denoted 511 in FIG. 5(b), are completely inside the CT validity mask 509, while other blocks are only partially within the CT validity mask 509, that is, are intersected by CT validity mask 509. The CT validity mask intersected blocks are called boundary blocks, and one such block is labeled B and denoted 513 in FIG. 5(b). Boundary blocks are combined with adjacent blocks of page element 201, resulting in blocks in merged image 205 that include pixels from both page element 201 and page element 203. In one embodiment, boundary blocks of D page element 203, for example, block 513, are merged differently from interior blocks of D page element 203, for example, block 511. It thus is necessary to identify boundary blocks.

In the preferred embodiment, as already discussed, the CT validity mask 509 is represented as a rectangular array of bits (a "bit-map"), each bit corresponding to a pixel in the CT image. If a bit in bit-map CT validity mask 509 is set, the corresponding pixel in page element 203 is visible. In an alternate embodiment, CT validity mask 509 is described as a path (a set of segments that together describe a shape). Other alternatives also are possible, as would be clear to those of ordinary skill in the art.

In the preferred embodiment in which CT validity mask 509 is a bit-map, a boundary block of the D page element 203 is a block for which at least one, but not all bits, are set in the pixels of bit-map CT validity mask 509 corresponding to the block. Interior blocks of D page element 203 have all the corresponding CT validity mask bits in bit-map 509 set.

In an alternate embodiment in which CT validity mask 509 is described as a path, the intersection of the CT validity mask and the boundary box of each block of D page element 203 is determined. The bounding box of a block is the (invisible) rectangular path that defines the boundary of the block. If the intersection is equal to the bounding box of the block, the block is an interior block of D page element 203. If the intersection is not empty and not equal to the block, then the block is a boundary block of D page element 203.

The merging of interior blocks of D 203 "into" page element 201 is now described with the help of FIG. 3, "into" used here since the order is that D is over E FIG. 3 for simplicity assumes that there are no boundary blocks in the D image, shown here as 303. The underneath page element in this simple example is shown as 301, and the desired merged image, as 305. In this embodiment, it is assumed that these CT images are compressed using JPEG, as described above. M image 305 is constructed by copying those blocks (compressed) from E page element 301 which need to be retained in M image 305, and all the interior blocks (compressed) of D page element 303, which in this simple case, are all the blocks of D page element 303

The following notation is used in describing how one locates the boundary blocks to copy:

(Px, Py) are the vertical and horizontal positions, respectively, in block coordinates of the location where page element D should be printed (in knockout) over page element E. The example of FIG. 3 shows page element D (303) to be placed over page element E (301) to give a combined image 305, (Px, Py)=(3, 2);

$E_{i,j}$ is the designation of a block in page element E, with $1 \leq i \leq E\_max\_vert$ and $1 \leq j \leq E\_max\_hor$, where $E\_max\_vert$ and $E\_max\_hor$ are the maximum block designations in the vertical and horizontal directions respectively, for page element E; and $D_{i,j}$ is the designation of a block in page element D, with $1 \leq i \leq D\_max\_vert$ and $1 \leq j \leq D\_max\_hor$ where $D\_max\_vert$ and $D\_max\_hor$ are the maximum block designations in the vertical and horizontal directions respectively, for page element D.

The block numbers of the source blocks to be copied are determined by the following pseudocode, which is shown for a two dimensional object. As would be clear to one of ordinary skill in the art, the "For i=1 to E_max_vert" and "next i" statements may be removed from the pseudocode when dealing only with a one block high strip of CT data.

```
For i = 1 to E__max__vert
    For j = 1 to E__max__hor
        if (i < Px) or (i ≥ Px + D__max__vert)
        or (j < Py) or (j ≥ Py + D__max__hor)
            copy Ei, j;
        else
            copy Di-Px+1,j-Py+1;
    next j;
next i;
```

Note that in the example of FIG. 3, E_max_hor equals 5, E_max_vert equals 5, D_max_hor equals 2, and D_max_vert equals 2. This means that the coordinates of a first block E1,1 of page element E are compared with the coordinates of the location where page element D should be placed over page element E. As i=1<Px=3, the block E1,1 is copied. The same is true for the blocks E1,2 to E1,5, for E2,1 to E2,5 and for E3,1. When the coordinates of block E3,2 are compared with the coordinates of the location where page element D should be placed over, this results in i=3=Px=3; i=3<Px+D_max_vert=5; j=2=Py=2; and j=2<Py+D_ max_hor=4. This means that the block with coordinates D(3−3+1),(2−2+1)=D1,1 will be copied. The method continues in the same way for the remaining coordinates.

Searching for block boundaries is facilitated, as described above, by searching for the special pattern of a RST marker in the data stream of an image. That is, in one embodiment, it is assumed either that the data has been compressed with RST markers in place, or that RST markers have been inserted into an already compressed data stream.

As each block contains enough information to derive its representing pixel value, decompression is unnecessary before copying to image M (305). In this way, the time used for decompression is eliminated. Furthermore image M (305) is still a compressed image, which saves storage space. Also the blocks of page element E (201) and the interior blocks of page element D (203) do not have intermediate uncompressed representations which again save storage space and bandwidth.

When more than two page elements are to be merged, for example, when there is also a page element 207 in addition to page elements E201 and D203, the compressed merging process can be performed by first merging page elements E and D into an intermediate merged image M1, and then merging the intermediate image M1 with page element 207 in the same way. Using this method, the relative positioning of page elements D and 207 is irrelevant. This is true, even if page element 207 overlaps with page element D. An alternate embodiment which performs better includes extending the (two-dimensional copying) pseudocode above in order to also test for block numbers that need to be replaced by 209 blocks.

In the preferred embodiment, 203 and 207 represent different CT page elements to be included in the final merged image 205. The final merged image is in the form of compressed merged CT data and may represent a complete page or part of a page.

When 203 and 207 represent different CT page elements to be included in the final merged image, the CT selection masks associated with each of these CT data also need to be merged. These are merged at the same time as the LW data is merged as described later herein.

Although the example used above to illustrate copying the interior blocks of D uses rectangular images, the method according to the present invention is not restricted to rectangular images. As discussed above, in general a mask 509 can accompany a non-rectangular page element D 203, indicating whether a block is a valid block of page element D or not. In this case, the (2-D copying) pseudocode above is applied only to interior blocks of page element D(203).

For the illustrative example of FIG. 3 or interior blocks of D (203), it has been assumed that in case of the JPEG compression format, the E and D images are compressed using the same JPEG scheme, including the same quantization tables and Huffman tables. When this is not the case, when later decompressing the merged data, the decompression scheme needs to be switched to the particular one of the copied block when such a block is encountered. How this is achieved is as follows. The compression module in our particular RIP knows only one Huffman table, and a limited set of quantization tables. This is not a limitation of the invention, simply an implementation choice. These quantization tables allow for different quality settings (high, medium or low). In a configuration having a "master" and a "variable" object, if a master is compressed with a high quality table and a variable object with a medium quality table, then the variable must be re-quantized. In a general case this would introduce additional rounding errors and thus an additional quality loss. To minimize this, the particular embodiment uses a set of different quantization tables such that the quantization coefficients of the medium quality table are the double the corresponding coefficients for the high quality table. The coefficients for the low quality table are then again the double. The merge thread 1109 re-codes all the page elements to the highest quality setting used on a page.

In the preferred embodiment, boundary blocks of D page element 203 are not merged in compressed form since each resulting block in merged image 205 contains a mix of pixels from the respective block in E page element 201 and the boundary block of D page element 203. So boundary blocks in D and the respective block in E are decompressed, merged in uncompressed form, and re-compressed to form the respective block in M image 205. It should be noted that the merging of boundary blocks using traditional uncompressed methods has minimal impact on the overall processing speed. The total number of blocks in any CT image element increases linearly with the area of the element—that is, quadratically with the size of the element, whereas the number of boundary blocks increases linearly with the perimeter of the element, thus linearly with size. For reasonably large elements, the fraction of blocks that are boundary blocks gets very small. Thus, it is said that in this embodiment for block-compressed CT images, the method described herein performs merging of data substantially in compressed form. For example, supposed that for a particular D image, the boundary blocks form less than 10% of the total blocks. Thus, using an embodiment of the method of the present invention, merging of more than 90% of the blocks avoids the computationally intensive steps of decompression prior to merging and re-compression after merging. As an example, for 300 pixels per inch printing, common for many short-run color printers, such as color laser printers, a small page element one inch square has 1444 8×8 JPEG blocks and 152 of these are on the boundary, about 10.5% of the total. This percentage goes down linearly as the size increases. That is, a 2 by 2 inch image has about 5.3% of the total JPEG blocks as boundary blocks, while for a 4 by 4 inch image, the percentage drops to about 2.6%. Thus, when a substantial majority of the blocks to be merged are merged in compressed form, it can be said that the method compresses substantially in compressed form.

In another aspect of the invention, the search time for blocks in the method may be significantly reduced. If it is known that a certain area or certain areas of E page element 201 will always be retained in M image 205, then it is not necessary for RST markers to exist for each block belonging to such a non-varying area. Thus, the amount of marker information may be reduced. A sequence of blocks may be handled as one complete block, herein called a superblock, with only one RST marker. Since the presence of RST markers reduces the compression ratio in JPEG, having fewer RST markers means a higher compression ratio for images. The search time for block boundaries also is reduced.

Figure 7:
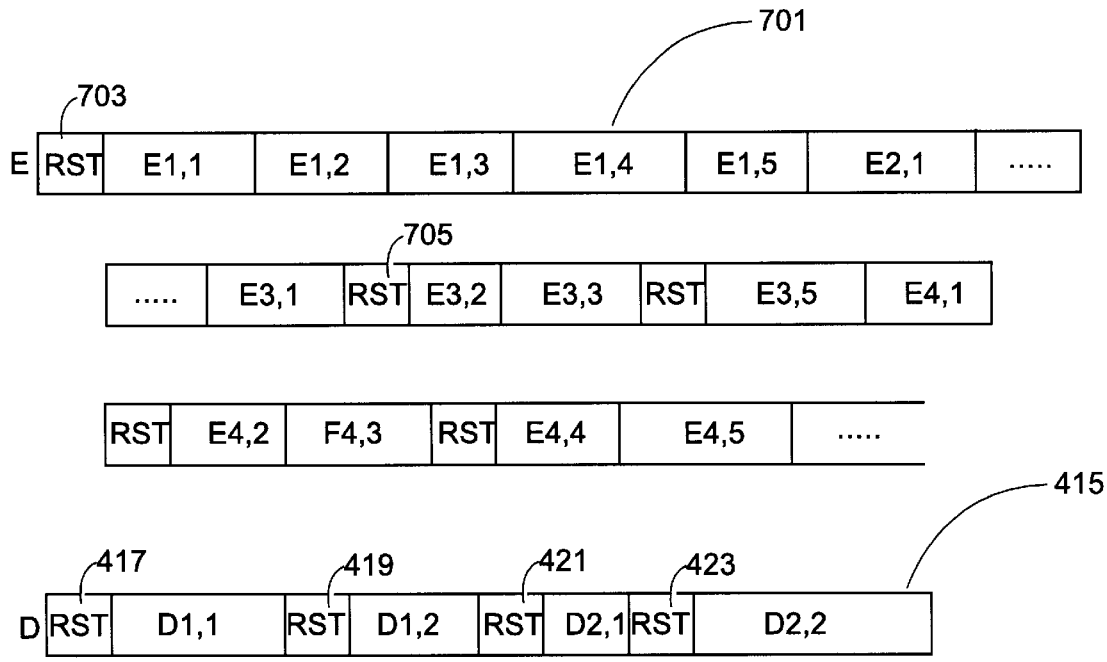
FIG. 7 shows a data stream where only a selection of the compressed block representations is preceded by a marker according to yet another aspect of the invention.

As a simplified example, consider again the images E (301) and D (303) of FIG. 3, with E3,2 E3,3 E4,2 and E4,3 being the only areas which are to be merged with D in page element E. Normally, that data is represented as shown in FIG. 4. However, using the knowledge of what areas of E page element 301 remain unchanging, in another embodiment of the method of the invention, the data stream is modified and represented as shown in FIG. 7. In page element E (now denoted 701), a first RST marker 703 is placed before block E1,1. The next RST marker 705 is only placed before the first block which can change, being block E3,2.

Similarly, in yet another aspect, fewer RST markers can be used, or, if RST markers are present throughout, RST markers can be removed from the data stream of page element D. The page element D to be merged with the page element E is divided into rows of blocks. That is, the superblocks are rows. For example, considering page element D (303) of FIG. 3, the blocks D1,1 and D1,2 form one row; and the blocks D2,1 and D2,2 form a second row. The data stream of page element D is now modified by including a first RST marker before block D1,1 and a second RST marker before block D2,1. RST markers are spread over page element E only when a new row of blocks starts. With such a scheme, it often is necessary to search for a block which is not preceded by a marker. In this embodiment, search for such a block requires partial decompression, and only of the data stream following the RST marker just before the location where D blocks should be placed (in knockout). Only partial decompression is needed because the actual pixel values are not required—only block boundaries are. In the case of JPEG compression, this partial decompression could be just the Huffman decoding step of JPEG decompression, resulting in a fixed length data stream for each block. This way, one can use the RST markers to skip to the location, but before the block position where replacement starts, and from then on one performs only partial decompression as far as is needed to reach the block position where replacement starts, which takes much less time than complete decompression. This embodiment thus involves a combination of compressed merging and partially compressed merging. Using this embodiment, the number of required RST markers is reduced, increasing the compression ratio, but at the cost of introducing additional time needed for the partial decompression.

Merging of Line Work Data (including the CT selection Mask)

Another feature of the present invention is for the case of page element 201 and page element 203 both comprising line work data. Line work data herein includes the CT selection mask as well as line work as is commonly understood in graphic arts, including logos, text, and other forms characterized by sharp boundaries. In the preferred embodiments, it is assumed that line work is represented by raster data, that is, in the pixel domain. This is the case, for example, if all page elements are available post RIPing, and preferably pre final screening, a RIPed image in this case comprising pixels, each pixel having four color values, C, M, Y, and K. As with CT data, LW data is merged one separation at a time.

In the preferred embodiment, the RLE used to compress line work is characterized as follows:

The raster data is arranged row by row, column by column;

For each row (or column, in some embodiments), adjacent pixels with equal color are grouped into runs. A run is a data structure defining the color and the number of pixels in the run of that color, that number called the "run length."

A row (or column in a column-wise embodiment), can be reconstructed by sequentially expanding the runs. Using an index i starting at i=0, for each run defined by pair (c,n), c the color, n the run length, n pixels of color c are generated at the pixels at i, i+1, . . . , i+n−1, respectively. Then i is incremented by n, and the next run is expanded.

As in the case of merging CT data, page element D may be of any shape; that is, available element D may have a mask associated with it. In the case of line work data, in the preferred embodiment, a special color value, called "background" is defined. All pixels not in the background color are, by definition, visible, and all pixels in the background color are invisible.

To enable merging of the CT selection mask at the same time as the LW data, the LW/CT selection mask is coded in a special way into the LW. In the case that a particular run is a run of CT data and not a run with a flat color, the run color is encoded with a special value to indicate this situation. Like the special color value for the background another special color value is reserved to indicate CT. In one embodiment, the special color value is added with an extra bit to the color, and in another embodiment it is just one free color from the range of unused colors. Contrary to the background color, the special CT indication color is treated in the same way as any other color. With this mechanism, the CT selection mask effectively is compressed with RLE and the merging of the CT selection mask occurs automatically with the LW merging method described herein.

For merging to occur while the data is compressed, in the preferred embodiment, one uses a method for locating the run that describes the pixel at some given location, denoted (x, y) herein. It will be assumed that the RLE is row by row, that is, along the x-axis. Assume also that one can quickly locate row y in the bitstream, for example, by using a data structure for the bitstream which includes the position in the bitstream of the start of row y. In the particular structure used for a page element file in the preferred embodiment, a header in the file contains an array (a lookup table) with at position y the byte offset of the first data of line y. Using this offset we can skip quickly to the data of that line.

To locate the run in row y containing pixel x, one sequentially scans the runs in row y, starting with the first run in row y. Index i is used, i initially set to zero, to keep track of the current position within a run. At the start of scanning any run, that run length is added to i until i>x. When i>x, the current run contains the pixel at (x, y), and that run starts at the previous i value. No decompression is needed. The only operation required is decoding the bitstream sufficiently to obtain the run length.

Figure 8:
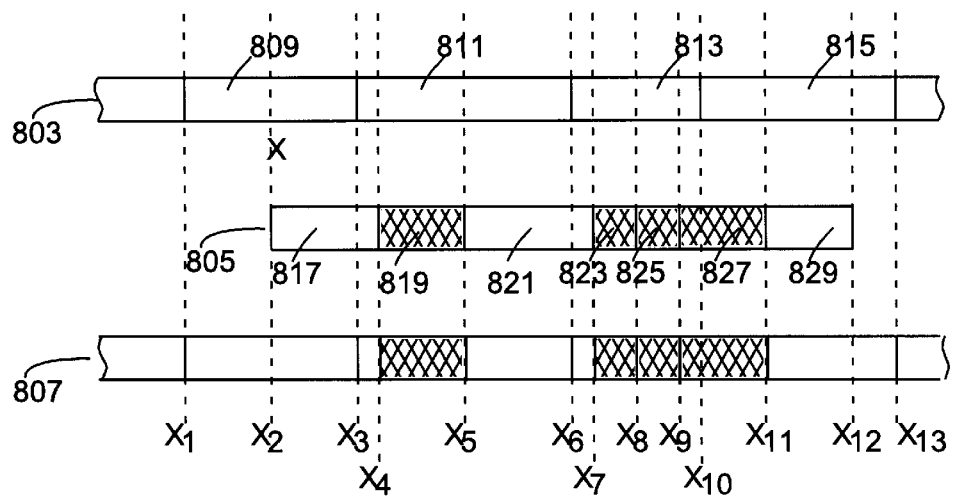
FIG. 8 shows an example of run length coded line work data before and after merging according to another aspect of the invention.
Figure 9A:
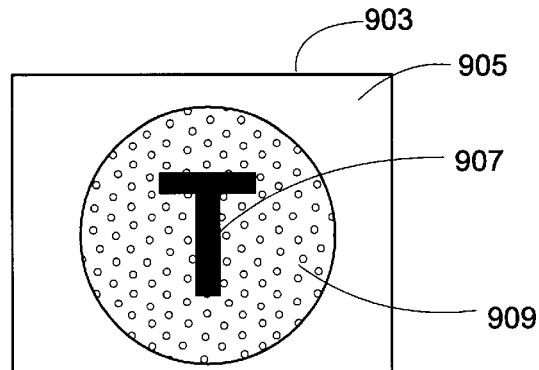
FIGS. 9(a)–(e) show an example of a page element and the structures stored in a page element file according to one embodiment of the invention.
Figure 9B:
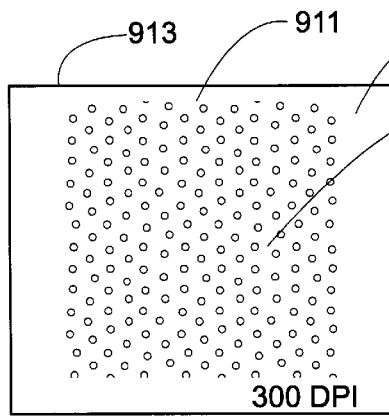
Figure 9C:
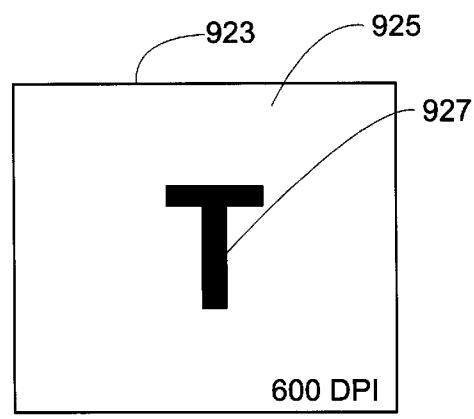
Figure 9D:
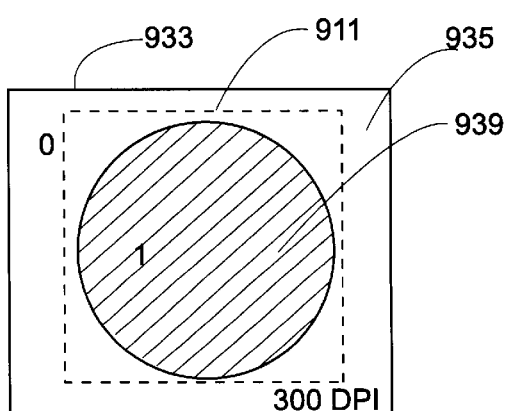
Figure 9E:
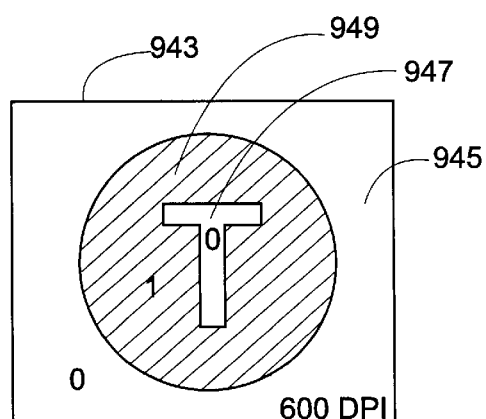

The merging step for line work data is now described. In the preferred embodiment, merging operates row by row, so the merging of only one row will be described with the aid of FIG. 8. In FIG. 8, only part of the E page element row, denoted 803, is shown. This is the part that contains those runs which either partially or totally overlap with the corresponding row of page element D, that row shown as 805. The four runs of row 803 partially or totally overlapping with 805 are denoted 809, 811, 813, and 815 respectively. All runs of page element row 805 are shown. Runs 817, 821 and 829 are in the background color, so are not visible in the merged image, while runs 819, 823, 825, and 827, shown hatched, are to be merged into row 803 of E. Assume that the row 805 of page element D (203) is to be merged at horizontal position X relative to the start of row 801 of page element E (201). The resulting merged row is shown as row 807 in FIG. 8. In the preferred embodiment, the merging operation comprises the following steps:

Starting from the left,

Runs of row 803 of E before the first row 809 of E that partially or totally overlap with the row 805 of D are copied unchanged to the output.

Runs of row 803 of E that partially or totally overlap with row 805 of D are copied to a temporary storage area as an ordered list. In FIG. 8, these copied rows are rows 809, 811, 813, and 815. Each run length in the elements of the ordered list is replaced by the x-coordinate of the first pixel in that run. Referring to FIG. 8, the x-coordinate of the first run 811 is obtained as described above using an index i. Coordinates of subsequent runs are obtained by adding run lengths to the x-coordinate of the first run 811 as additional runs are copied. Thus a temporary list is determined, the list including coordinate $X_1$, at the color of run 809, coordinate $X_3$ at the color run of 811, coordinate $x_6$ at the color of run 813, and coordinate $x_{10}$ at the color of run 815. An extra element is now added to the end of the list with the coordinate entry the coordinate of the last pixel of the last run of E, 815, plus 1, and a color "don't care". In FIG. 8, the x-coordinate of the additional item is $x_{13}+1$.

The row runs of D are copied to a second temporary storage area as a second ordered list, and again, the run lengths in each list element are replaced by the x-coordinate of the start of that run. The first element as x-coordinate $X(=x_2)$. Again, an extra item is added to the list, the x-coordinate of the extra item being the coordinate of the last pixel of the last run in page element-row 805, plus one, and the color of the extra element being background. For the situation depicted in FIG. 8, the linked list comprises (color of 817, $X_3$), (color of 819, $X_4$), (color of 821, $x_5$), (color of 823, $x_7$), (color of 825, $x_8$), (color of 827, $x_9$), (color of 829, $x_{11}$), (background, $x_{12}+1$).

The two ordered lists are merged into a single ordered list and a label is added to each item which describes the origin of that run. The three possible label values are: from the row of E, from the row of D in background color, or from the page element row and not in background color. Denoting these three cases by "f", "vb" and "v", respectively, for the situation illustrated in FIG. 8, the colors, x-coordinates and labels in the new merged list are (color of 809, $x_1$; f), (background, $x_2$; vb), (color of 811, $x_3$; f), (color of 819, $x_4$; v), (background, $x_5$; vb), (color of 813, $x_6$; f), (color of 823, $x_7$; v), (color of 825, $x_8$; v), (color of 827, $x_9$; v), (color of 815, $x_{10}$; f), (background, $x_{11}$; vb), (don't-care, $X_{12}+1$; vb), (don't-care, $X_{13}+1$; f).

The merged list is now scanned in order. For each run encountered, one or more operations of six possible operations is carried out, depending on the label on the current run and the next run. The possible operations are:

Advance: make the next run the current run
Delete: delete the current run, then make the next run the current run
Delete Next: delete the next run
Pick Color: save the color of the current run in a register (i.e., as a saved variable)
Apply Color: replace the color of the current color by the saved color (i.e., by the color in the register)
Which operations to carry out is described by Table 5.

TABLE 5

| label on current row | label on next screen | | |
|---|---|---|---|
| | f | vb | v |
| f | Pick Color and Advance | Pick Color and Delete Next | Pick Color and Advance |
| vb | Apply Color and Advance | Apply Color and Delete Next | Apply Color and Advance |
| v | Pick Next Color and Delete Next | Advance | Advance |

Thus, elements are deleted from the list that are background run starts following a background run, a background run start following a E run or a E run start following a run of D. Also, the colors of some runs of E are stored, and those colors are applied to selected background colors.

In the example of FIG. 8, the runs starting as $x_2$, $x_{10}$, and $x_{12}+1$ are deleted. The background color of the run starting at $x_5$, is replaced by the color of 811, and the background color of the run starring at $x_{11}$ is replaced by the color of run 815.

The last run in the list (the run starting at $X_{13}+1$) is now deleted. For the example, the list now includes the following runs: (color of 809, $x_1$), (color of 811, $x_3$), (color of 819, $x_4$), (color of 811, $x_5$), (color of 813, $x_6$), (color of 823, $x_7$), (color of 825, $x_8$), (color of 827, $x_9$), (color of 815, $x_{11}$).

At this stage, the x-positions in the list are replaced by the run-lengths; these run lengths determined from successive x-values. Also, any zero-length runs are deleted from is the list, and the result is copied as the merged row 807.

The remaining runs of the row of page element 201 are now copied to the output.

Thus the line is merged. This is carried out for all lines. It should be noted that in all the above steps, decompression never takes place. Thus, a method of merging compressed line work images without decompressing has been described.

In another embodiment, transparent overprinting is made possible by appending the run information, being run length and run color, with run alpha. The run alpha is a measure for transparency of the run. When merging two pieces of runs of the same length, one run piece with run color "a" and run alpha "t" on top of another run piece with color b, then the resulting run color is taken to be min((a*t+b*(max_alpha-t))/max_alpha, max_color). Where "max_alpha" is the maximum value of the run alpha and max_color is the maximum color intensity value. In yet another embodiment the color of the resulting run is taken to be just max(a, b). In this context, colors (CMYK) of increasing intensity have increasing color values i.e., for white all color separation values are zero.

When more than one page element is to be merged with page element 201, for example, there is also an object 207 in addition to element 203, the compressed merging process can be performed, just as in the CT case, by first merging 201 and 203 into an intermediate merged image, and then merging 209 into the intermediate merged image.

Alternatives to Speeding Up the Copying Operations

In some applications, a large number of customized merged pages may need to be generated based on the same E page element. In such a situation, the same blocks need to be located many times. The page element cache 1011 already has been described.

In an alternate embodiment of the method of the invention, in order to reduce the search time in such a situation, different caching structures alternatively may be used. For example, a block-cache (for CT images) or a run-cache (for line work images) may be used. The block-cache (or run-cache for line work) is implemented as a hash table comprising key-value pairs. A key preferably includes: the identification (an "ID") of the element and the coordinates of a block (or run) in the element. The output of the table using any keypair is the bit position in the data stream (bitstream) of the block (or run) corresponding to the key. If during the merging process, a block that is not already in the block-cache (or run-cache) is encountered, that block (or run) is added to the hash table of the block-cache (or run-cache). Preferably, the "Least Recently Used" ("LRU") strategy many be used to discard old elements from the block-cache (or run-cache). Other strategies may be used.

Also, as would be clear to those of ordinary skill in the art, implementations other than a hash table may be used to implement a block-cache (or run-cache) for frequently encountered blocks (or runs) of page element 201. Also, in one embodiment, the block-cache and run-cache schemes can be programmed into any special caching hardware such as cache system 149 in file subsystem 125 of assembler computer system 110 shown in FIG. 1.

For applications where there is a "master" page element and a variable one, always having the same layout, the following implementation for a line cache might be implemented. If we repeatedly put an object of size $s_x$, $S_y$, on position $p_x$, $p_y$ on top of master page element $m_i$, then we will repeatedly have to seek to the endpoints $p_x+s_x$ of the scanlines $p_y$ to $p_y+s^y$ of object $m_i$. So we could cache the byte offsets of the runs that contain that endpoint. In order to be able to retrieve those indexes we must give them a unique id, that can be based on object id $m_i$, separation s and position x, y. As with the previously described page element cache 1011 we can clear out all the references of objects that we don't need anymore in the current book.

When implemented, for example, on assembler computer system 110 of FIG. 1, the copying step or steps of compressed merging can be speeded up even further by using what is called a "scatter-gather" direct memory access ("DMA") technique. Such a DMA technique is preferably implemented by a hardware DMA controller (shown as 131 in FIG. 1 ), that is set up with an (address,count)-pair, and has direct access to memory 130, bypassing the registers of processor 112. DMA controller 131 reads the data from a RAM address by the address value in its address counter, writes this data to a destination, increments its address value and decrements its count. It does so until its counter reaches zero. As these RAM accesses occur directly through hardware such memory copy operations execute a lot faster compared to memory copy operations executed by processor 112 that is commanded by instructions. Typically, DMA controller 131 is set up and started by processor 112 with an (address,count)-pair. When the copy operation is done, DMA controller 131 interrupts the processor 112. In this way processor 112 is involved only for sending each (address, count)-pair to DMA controller 131. In one embodiment, DMA controller 131 has scatter-gather functionality, which means that it is able to access a list in memory containing several, possibly many (address,count)-pairs. DMA controller 131 then executes the copy operations for each of these pairs automatically. In this case, processor 112 is involved even less at the startup for creating a list of pairs and forwarding the start address of the list to DMA controller 131 and at the termination of the last pair of the list.

In another embodiment of this invention, (address, count)-pairs representing the location and amount of data that needs to be copied from either E or D, as the case may be, are set up and loaded into memory, the start address of the first pair is loaded into DMA controller 131 with scatter-gather capability, and the DMA transfer is commenced. As the copying process occurs using special purpose hardware, the merging process can be significantly speeded up.

Apparatus for Merging

Figure 14:
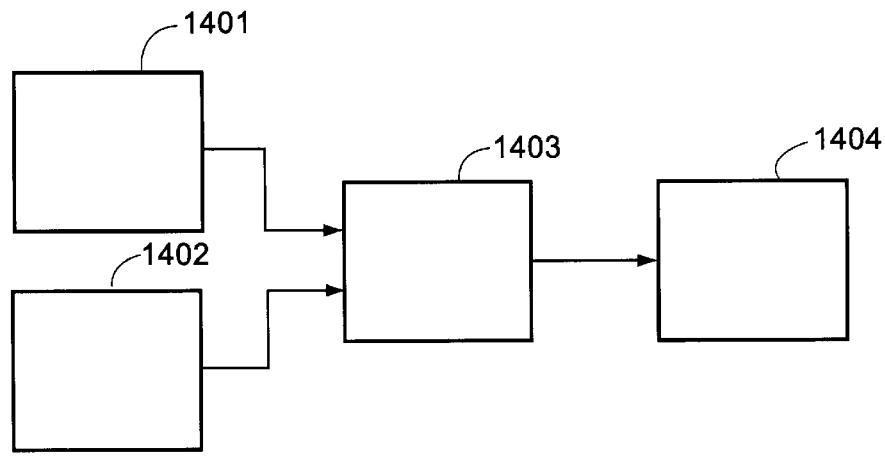
FIG. 14 is a block diagram of an apparatus according to an aspect of the invention.

A schematic illustration of an apparatus for merging page elements into compressed merged data according to an aspect of the present invention is shown in FIG. 14. The apparatus comprises a first storage device 1401 where images, preferably raster images of individual page elements or groups of page elements, are stored in a compressed format. In a second storage device 1402 a page composition script is stored. This page composition script specifies the identifiers and the positions of the page elements or groups of page elements which are to be included on the compressed merged data to be formed. The compressed merged data may represent a complete page or part of a page. On the basis of what is specified by the page composition script (also called the page merge script and page layout script), merging means 1403 retrieve compressed data of the individual page elements or the groups of page elements stored in the first storage device 1401, and merge them according to the page composition script into compressed merged data. No decompression has been carried out in order to obtain the compressed merged data.

Storage devices 1401 and 1402 may be part of the file storage system 125 of assembler computer system 110 of FIG. 1. In the preferred embodiment, storage device 1401 is a RAID subsystem in file system 125, and storage device 1402 is a disk drive. Alternatively, storage device 1401 may be a large high speed buffer memory device comprising a large amount of RAM for storing the raster images of individual page elements or groups of page elements in a compressed format, so that this data is rapidly available for processing.

The merging means 1403 may be implemented as software running on processor 112, or a piece of hardware circuitry, which may include a separate processor, for carrying out the function. If the merging means 1403 include a processor and a memory, said memory includes a set of computer instructions running on said processor. This set of computer instructions causes the processor to read the page composition script and to retrieve the page elements as specified in the page composition script. Merging means 1403 may also include a DMA controller with or without scatter-gather capability for speeding up the merging as described above.

Decompressing means 1404 also may be added, and implemented as software running on processor 112, or as a piece of hardware circuitry, which may include a separate processor, for decompressing the compressed merged data in order to have it printed. If the decompressing means 1404 include a processor and a memory, the memory includes a set of computer instructions running on the processor. This set of computer instructions causes the processor to decompress the compressed merged data.

In cases when different compression schemes are used for line work and picture data, in one embodiment, the merging means is duplicated, and in another the merging means has two operating modes, depending on the encountered format.

The preferred embodiments of the method and apparatus of the present invention have been described assuming, as an example, JPEG compression for CT data and RLE for line work. The method and apparatus disclosed are not restricted to these particular compression formats. They can be used with any compression format as long as the format allows insertion of bitstreams representing compressed image representations into a similarly formatted bitstream. Where these bitstreams should be inserted can then be specified by a marker (when the compression format allows) or a pointer (kept separate from the format).

Hence, although this invention has been described with respect to preferred embodiments, those embodiments are illustrative only. No limitation with respect to the preferred embodiments is intended or should be inferred. It will be observed that numerous variations and modifications may be effected without departing from the true spirit and scope of the novel concept of the invention, and it is intended that the scope of the invention be defined by the claims appended hereto.

What is claimed is:

1. A method for merging a first page element with a second page element into a merged page for printing, the merging according to a pre-specified order and positioning, the first and second page elements stored in a page element store in a format, said format for each page element including compressed raster image data of the page element, the method comprising the steps of:

(a) reading the compressed raster image data of the first and second page elements from the page element store into a memory;

(b) merging the compressed raster image data of the first page element with the compressed raster image data of the second page element to form compressed merged raster image data, the comprising merged raster image data describing the printed appearance of the merged page, the merging according to the pre-specified order and relative positioning, the merging merging substantially without decompressing the compressed raster image data of the page elements (c) decompressing the compressed merged raster image data into printing data; and (d) printing the printing data.

2. A method of generating a page for an output printing device, the method including the steps of (a) preparing a plurality of page elements to be combined on the page, each page element in the form of a corresponding page element description;

(b) RIPing and compressing the page element description of the page elements to form compressed rasterized page elements;

(c) storing the compressed rasterized page elements in a page element store;

(d) specifying the positioning and order of merging and type of merging for the page elements on the page, the specifying generating a page layout script;

(e) merging the page elements according to the page layout script, the merging generating compressed image data that represents the page, the merging occurring substantially in the compressed domain;

(f) decompressing the compressed image data into raster image data; and (g) printing the raster image data on the output printing device.

3. The method according to claim 2 wherein one of the page elements includes line work data.

4. The method according to claim 2 wherein one of the page elements includes CT data.

5. The method according to claim 4 wherein the CT data-containing page element also includes associated mask data to define a mask around the CT data.

6. The method according to claim 5 wherein the CT data-containing page element also includes line work data, and wherein the RIPing and compressing step of the page element description of the CT data-containing page element comprises:

(i) RIPing the page element description into line work raster data and CT raster data, (ii) compressing the line work raster data using a line work compression method to form compressed line work data, and (iii) compressing the CT raster data using a CT compression method to form compressed CT data, the compressed rasterized page element determined from page element description of the CT data-containing page element including the compressed line work data, the compressed CT data and the mask data.

7. The method according to claim 6 wherein the compressed page element determined from the CT data-containing page element also includes a CT selection mask, the CT selection mask identifying each pixel in the page element as a line work pixel or a CT pixel.

8. The method according to claim 7 wherein the CT selection mask is in compressed form in the compressed rasterized page element determined from the page element description of the CT data-containing page element.

9. The method according to claim 7, wherein the step (e) of merging further includes (i) merging the mask data for all page elements that include CT data to form a merged CT selection mask, (ii) merging the compressed line work data of all the page elements that include line work data to form compressed merged line work data, and (iii) merging the compressed CT data of all the page elements that include CT data to form compressed merged CT data, wherein the merging of mask data, compressed line work data and compressed CT data occurs substantially in the compressed image domain; and wherein the step (f) of decompressing comprises:

(i) decompressing the compressed merged CT data to form decompressed merged CT data, (ii) decompressing the compressed merged line work data to form decompressed merged line work data, and (iii) combining the decompressed line work data and the decompressed CT data, the combining comprising selecting pixels for printing step (g) from the decompressed merged line work data or decompressed merged CT data according to the value of the merged CT selection mask.

10. The method according to claim 6 wherein said step (e) of merging further includes (i) merging the mask data for all page elements that include CT data to form compressed mask data (ii) merging the compressed line work data of all the page elements that include line work data to form compressed merged line work data, and (iii) merging the compressed CT data of all the page elements that include CT data to form compressed merged CT data, the merging of mask data, compressed line work data and compressed CT data occurring substantially in the compressed image domain.

11. The method according to claim 10 wherein the step (f) of decompressing comprises:

(i) decompressing the compressed merged CT data to form decompressed merged CT data, (ii) decompressing the compressed merged line work data to form decompressed merged line work data, and (iii) combining the decompressed merged line work data and the decompressed merged CT data to form the raster image data.

12. The method according to claim 6 wherein the line work compression method is a run length encoding method (RLE).

13. The method according to claim 12 wherein the compressing the line work data in said step (b) of RIPing and compressing includes adding line work location data to the compressed line work data to enable quickly locating a desired location in the compressed line work data, the line work location data including a lookup table containing an offset to the beginning of each row of line work data.

14. The method according to claim 6 wherein the line work data is at a line work resolution and the CT data is at a CT resolution, the line work resolution being the same as the CT resolution.

15. The method according to claim 6 wherein the line work data is at a line work resolution and the CT data is at a CT resolution, the line work resolution being different from the CT resolution and being at the resolution of the output printing device.

16. The method according to claim 5 wherein the CT compression method is a block based method.

17. The method according to claim 16 wherein the block based method is JPEG.

18. The method according to claim 17 wherein the compressing of the CT data in said step (b) of RIPing and compressing includes adding CT location data to the compressed CT data to enable quickly locating a desired location in the compressed CT data, the CT location data including restart markers in the JPEG data forming the compressed CT data.

19. The method according to claim 17 wherein the JPEG method uses a set of one or more quantization tables, each quantization table corresponding to a corresponding compression quality.

20. The method according to claim 19 wherein the set of quantization tables includes a plurality of compensation tables that are related to each other by a set of relationships designed for making re-quantization computationally efficient.

21. The method according to claim 16 wherein the relative positioning of CT data to be merged is on the boundaries of the blocks defined by the CT compression method.

22. The method according to claim 21 wherein step (e)(iii) of merging the CT data includes repositioning the CT data so that merging occurs on CT block boundaries.

23. The method according to claim 5 wherein the mask around the CT data defines the shape of the CT data of the page element.

24. The method according to claim 23 wherein the mask is a bit map.

25. The method according to claim 23 wherein the mask is a clipping path.

26. The method according to claim 2 wherein step (b) of RIPing and compressing includes adding location data to the compressed rasterized page elements, the location data enabling quickly locating a desired location in the compressed page element.

27. An apparatus for merging a plurality of page elements into compressed merged image data, the apparatus comprising
(a) a first storage device where a set of page elements including the plurality of page elements are stored in a compressed format;
(b) a second storage device in which is stored a page composition script, the page composition script specifying the positioning and order of merging and type of merging for the page elements on the page; and
(c) a merge system including:
(i) means for retrieving the compressed data of the individual page elements stored in the first storage device according to the page composition script, and
(ii) means for merging the retrieved page elements according to the page composition script into the compressed merged data, the merging substantially in the compressed domain so that substantially no decompression takes place.

28. The apparatus for merging according to claim 27 wherein the first storage device is a RID system.

29. The apparatus for merging according to claim 27 wherein at least one of the storage devices is a memory and wherein the merge system includes one or more processors and a set of software programming instructions which when run on one of the processors cause the processor to read the page composition script, wherein the retrieval means includes retrieval programming instructions which retrieve the compressed data when run on one of the processors, and wherein the merging means includes merging programming instructions which merge the compressed data when run on one of the processors.

30. The apparatus for merging according to claim 29 further comprising:
(d) decompressing means for decompressing the compressed merged data into printing data for printing on an output printing device.

31. The apparatus for merging according to claim 27 wherein one of the plurality of page elements includes line work data compressed using a line work compression method and wherein one of the plurality of page elements includes CT data compressed using a CT compression method.

32. A system for merging page elements onto a page to form merged page data and for printing the merged data on an output printing device, the output printing device including print heads operating at a print rate, the system including
(a) a RIP to form compressed rasterized page element data from page element data;
(b) a page element store for storing the compressed rasterized page element data;
(c) a merge system for running a page layout script, the page layout script specifying the positioning and order of merging and type of merging for the page elements on each of a set of pages, the merge system including:
(i) a read subsystem for retrieving compressed rasterized page element data from the page element store according to the page layout script, and
(ii) a merger for merging the retrieved compressed data according to the page layout script, the merging substantially in the compressed domain and forming merged compressed data; and
(d) a decompressor to form decompressed page data from the merged compressed data.

33. The system according to claim 32 wherein the page element data is in a page description language.

34. The system according to claim 32 wherein the compressed rasterized page element data includes line work compressed data compressed according to a line work compression scheme and CT compressed data compressed according to a CT compression scheme, the read subsystem retrieving line work compressed data and CT compressed data, and the merger merging the retrieved line work compressed data into line work merged compressed data and the retrieved CT compressed data into CT merged compressed data according to the page layout script.

35. The system according to claim 34 wherein the read system retrieves the line work compressed data and the CT compressed data into a page element cache, and wherein the merger obtains the line work compressed data and the CT compressed data as required by the page layout script from the page element cache.

36. The system according to claim 35 wherein the page element cache is a memory.

37. The system according to claim 36 wherein the read system comprises a set of programming instructions that when loaded into a processor memory of a processor and run on the processor, carry out a set of steps including, for each page specified in the page layout script, for each page element of the specified page, checking if the page element is already present in the page element cache and loading into the page element cache each page element that is not yet present in the page element cache, the loading comprising:

checking if there is enough free space in the page element cache and if not, waiting until space is freed by the merger or until a particular number of pages have all page elements are all in the page element cache, if the number of pages whose page elements are in the page element cache is less than the particular number and if there still is not enough space in the page element cache, removing page elements from the page element cache according to a removal criterion, and allocating space in the page element cache and loading the page element into the page element cache.

38. The system according to claim 35 wherein the merge system includes sets of programming instructions running on one or more processors, each set of instructions operating as a thread, each thread having an associated memory arranged as an associated input buffer and an associated output buffer, each thread using data from its associated input thread and loading data into its associated output thread.

39. The system according to claim 34 wherein the decompressor decompresses the line work merged compressed data into decompressed line work page data and the CT merged compressed data into decompressed CT page data.

40. The system according to claim 39 further comprising (e) a combiner which combines the decompressed line work page data and the decompressed CT pace data into printing data and feeds the printing data to the print heads of the output printing device at the print rate required by the print heads.

41. The system according to claim 34 wherein the compressed rasterized page element data is unscreened.

42. The system according to claim 41 wherein the decompressor decompresses the line work merged compressed data into decompressed line work page data and the CT merged compressed data into decompressed CT page data, the system further including a combiner/screener which combines the decompressed line work page data and the decompressed CT page data into page data, screens the page data and feeds the screened page data to the print heads of the output printing device at the print rate required by the print heads.

43. The system according to claim 34 wherein the compressed rasterized page element data is separated into printing colors.

44. The system according to claim 34 wherein the line work compression scheme is a run length encoding scheme and the CT compression scheme is a JPEG compression scheme.

45. The system according to claim 32 wherein the page element store is a RAID system.

* * * * *

UNITED STATES PATENT AND TRADEMARK OFFICE
CERTIFICATE OF CORRECTION

PATENT NO. : 6,049,390
DATED : April 11, 2000
INVENTOR(S) : Notredame, et al.

It is certified that error appears in the above-identified patent and that said Letters Patent is hereby corrected as shown below:

Claim 1,
Line 15, change "comprising" to -- compressed --;
Line 18, delete one of the instances of "merging";

Claim 28,
Line 2, change "RID" to -- RAID --.

Column 2,
Line 49, after "211" insert a period.

Column 7,
Lines 35-36, delete "is described".

Column 13,
Line 6, change "919" to -- 911 --;
Line 17, change "white are" to -- white area --;
Line 26, change "939" to -- 949 --.

Column 19,
Line 54, after "in more" delete "a more".

Column 20,
Line 20, change "of lists of lists" to -- of lists --;
Line 41, delete "1315".

Column 24,
Line 22, change "1113" to -- 1209 --.

Column 25,
Line 5, after "page buffer" insert a period.

UNITED STATES PATENT AND TRADEMARK OFFICE
CERTIFICATE OF CORRECTION

PATENT NO.    : 6,049,390
DATED         : April 11, 2000
INVENTOR(S)   : Notredame, et al.

It is certified that error appears in the above-identified patent and that said Letters Patent is hereby corrected as shown below:

Column 32,
Line 20, after "page element 303" insert a period.

Column 38,
Line 66, change "many" to -- may --.

Signed and Sealed this

Eighteenth Day of September, 2001

Attest:

NICHOLAS P. GODICI
Acting Director of the United States Patent and Trademark Office Attesting Officer